US010291910B2

(12) United States Patent
Adsumilli et al.

(10) Patent No.: US 10,291,910 B2
(45) Date of Patent: May 14, 2019

(54) SYSTEMS AND METHODS FOR SPATIALLY ADAPTIVE VIDEO ENCODING

(71) Applicant: GoPro, Inc., Carlsbad, CA (US)

(72) Inventors: Balineedu Chowdary Adsumilli, San Francisco, CA (US); Adeel Abbas, Carlsbad, CA (US); David Newman, San Diego, CA (US)

(73) Assignee: GOPRO, INC., San Mateo, CA (US)

( * ) Notice: Subject to any disclaimer, the term of this patent is extended or adjusted under 35 U.S.C. 154(b) by 197 days.

(21) Appl. No.: 15/334,213

(22) Filed: Oct. 25, 2016

(65) Prior Publication Data

US 2017/0237983 A1    Aug. 17, 2017

Related U.S. Application Data

(60) Provisional application No. 62/294,925, filed on Feb. 12, 2016.

(51) Int. Cl.
*H04N 19/124*    (2014.01)
*H04N 19/154*    (2014.01)
(Continued)

(52) U.S. Cl.
CPC ......... *H04N 19/124* (2014.11); *H04N 19/154* (2014.11); *H04N 19/167* (2014.11);
(Continued)

(58) Field of Classification Search
CPC .................................................. H04N 19/124
See application file for complete search history.

(56) References Cited

U.S. PATENT DOCUMENTS 5,649,032 A    7/1997    Burt et al.
6,389,179 B1    5/2002    Katayama et al.
(Continued)

FOREIGN PATENT DOCUMENTS

CN    104735464 A    6/2015
EP    1162830 A2    12/2001
(Continued)

OTHER PUBLICATIONS

Grois D., et al., "Complexity-Aware Adaptive Spatial Pre-Processing for ROI Scalable Video Coding With Dynamic Transition Region", Image Processing (ICIP), 2011 18th IEEE International Conference on, IEEE, Sep. 11, 2011, pp. 741-744, XP032080597, DOI: 10.1109/ICIP.2011.6116661, ISBN: 978-1-4577-1304-0.
(Continued)

*Primary Examiner* — James M Pontius
(74) *Attorney, Agent, or Firm* — Gazdzinski & Associates, PC

(57) ABSTRACT

Systems and methods for providing video content using spatially adaptive video encoding. Panoramic and/or virtual reality content may be viewed by a client device using a viewport with viewing dimension(s) configured smaller than available dimension(s) of the content. Client device may include a portable media device characterized by given energy and/or computational resources. Video content may be encoded using spatially varying encoding. For image playback, portions of panoramic image may be pre-encoded using multiple quality bands. Pre-encoded image portions, matching the viewport, may be provided and reduce computational and/or energy load on the client device during consumption of panoramic content. Quality distribution may include gradual quality transition area allowing for small movements of the viewport without triggering image re-encoding. Larger movements of the viewport may automati-
(Continued)

cally trigger transition to another spatial encoding distribution.

20 Claims, 9 Drawing Sheets

(51) Int. Cl.
*H04N 19/17* (2014.01)
*H04N 21/218* (2011.01)
*H04N 21/2343* (2011.01)
*H04N 21/81* (2011.01)
*H04N 19/167* (2014.01)

(52) U.S. Cl.
CPC ....... *H04N 19/17* (2014.11); *H04N 21/21805* (2013.01); *H04N 21/23439* (2013.01); *H04N 21/234345* (2013.01); *H04N 21/816* (2013.01)

(56) References Cited

U.S. PATENT DOCUMENTS

| | | | |
|---|---|---|---|
| 8,606,073 | B2 | 12/2013 | Woodman |
| 9,171,577 | B1 | 10/2015 | Newman et al. |
| 9,277,122 | B1 | 3/2016 | Imura et al. |
| 9,355,433 | B1 | 5/2016 | Adsumilli et al. |
| 9,369,689 | B1 | 6/2016 | Tran et al. |
| 9,478,054 | B1 | 10/2016 | Lewis et al. |
| 9,575,803 | B2 | 2/2017 | Chauvet et al. |
| 9,681,111 | B1 | 6/2017 | Newman |
| 2001/0047517 | A1 | 11/2001 | Christopoulos et al. |
| 2003/0007567 | A1 | 1/2003 | Newman et al. |
| 2003/0035047 | A1 | 2/2003 | Katayama et al. |
| 2003/0234866 | A1 | 12/2003 | Cutler |
| 2005/0226483 | A1 | 10/2005 | Geiger et al. |
| 2006/0159352 | A1 | 7/2006 | Ishtiaq et al. |
| 2006/0188014 | A1 | 8/2006 | Civanlar et al. |
| 2006/0256397 | A1 | 11/2006 | Cui |
| 2006/0268131 | A1 | 11/2006 | Cutler |
| 2007/0025723 | A1 | 2/2007 | Baudisch et al. |
| 2007/0064800 | A1 | 3/2007 | Ha |
| 2007/0237420 | A1 | 10/2007 | Steedly et al. |
| 2008/0304567 | A1 | 12/2008 | Boyce et al. |
| 2009/0180552 | A1 | 7/2009 | Visharam et al. |
| 2010/0014780 | A1 | 1/2010 | Kalayeh |
| 2010/0054628 | A1 | 3/2010 | Levy et al. |
| 2010/0158134 | A1 | 6/2010 | Yin et al. |
| 2012/0092453 | A1 | 4/2012 | Suh |
| 2012/0242788 | A1 | 9/2012 | Chuang et al. |
| 2012/0307000 | A1 | 12/2012 | Doepke et al. |
| 2014/0152863 | A1 | 6/2014 | Drouot |
| 2014/0218354 | A1 | 8/2014 | Park, II et al. |
| 2014/0258552 | A1 | 9/2014 | Oyman et al. |
| 2014/0292751 | A1* | 10/2014 | Azar .................. G06T 9/00 345/420 |
| 2015/0065803 | A1 | 3/2015 | Douglas et al. |
| 2015/0109468 | A1 | 4/2015 | Laroia et al. |
| 2015/0124877 | A1 | 5/2015 | Choi et al. |
| 2015/0138311 | A1 | 5/2015 | Towndrow |
| 2015/0249813 | A1 | 9/2015 | Cole et al. |
| 2015/0296231 | A1 | 10/2015 | Kwon et al. |
| 2015/0341552 | A1 | 11/2015 | Chen et al. |
| 2015/0341557 | A1 | 11/2015 | Chapdelaine-Couture et al. |
| 2015/0346832 | A1 | 12/2015 | Cole et al. |
| 2016/0012855 | A1* | 1/2016 | Krishnan .............. G11B 27/105 386/241 |
| 2016/0014422 | A1 | 1/2016 | Su et al. |
| 2016/0050423 | A1 | 2/2016 | Alshina et al. |
| 2016/0065947 | A1 | 3/2016 | Cole et al. |
| 2016/0142697 | A1 | 5/2016 | Budagavi et al. |
| 2016/0241892 | A1 | 8/2016 | Cole et al. |
| 2016/0253795 | A1 | 9/2016 | Cole et al. |
| 2016/0274338 | A1 | 9/2016 | Davies et al. |
| 2016/0295128 | A1 | 10/2016 | Schnittman et al. |

FOREIGN PATENT DOCUMENTS

| | | |
|---|---|---|
| WO | WO-2013130071 A1 | 9/2013 |
| WO | 2015014773 A1 | 2/2015 |
| WO | 2015128634 | 9/2015 |

OTHER PUBLICATIONS

Grois, et al., "Efficient Adaptive Bit-Rate Control for ROI Scalable Video Coding", Workshop on Picture Coding and Image Processing 2010; Jul. 12, 2010-Jul. 12, 2010; Nagoya, Dec. 7, 2010 (Dec. 7, 2010), XP030082089.

Grois, et al., "Recent Advances in Region-of-Interest Video Coding" In: "Recent Advances on Video Coding", Jul. 5, 2011 (Jul. 5, 2011), InTech, XP055257835, ISBN: 978-953-30-7181-7 DOI: 10.5772/17789.

Ichimura D., et al., "Slice Group Map for Mult. Interactive ROI Seal", 17. JVT Meeting; 74. MPEG Meeting; Oct. 14, 2005-Oct. 21, 2005; Nice, FR;(Joint Video Team of ISO/IEC JTC1/SC29/WG11 and ITU-T SG.16 ), No. JVT-Q020r1, Oct. 14, 2005 (Oct. 14, 2005), XP030006183, ISSN: 0000-0413.

Ugur. et al.,"MV-HEVC/SHVC HLS: On default Output Layer Sets", Jan. 2014.

Won, et al., "Size-Controllable Region-of-Interest in Scalable Image Representation", IEEE Transactions on Image Processing, IEEE Service Center, Piscataway, NJ, US, vol. 20, No. 5, May 1, 2011 (May 1, 2011 ), pp. 1273-1280, XPO 11411787, ISSN: 1057-7149, DOI: 10.1109/TIP.2010.2090534.

Achanta R., et al., "Slic Superpixels Compared to State-of-the-Art Superpixel Methods," IEEE Transactions on Pattern Analysis and Machine Intelligence, 2012, vol. 34 (11), pp. 2274-2282.

Allène C., et al., "Seamless Image-based Texture Atlases Using Multi-band Blending," Pattern Recognition, 2008. ICPR 2008. 19th International Conference on, 2008.

Badrinarayanan V., et al., "Segnet: a Deep Convolutional Encoder-Decoder Architecture for Image Segmentation," arXiv preprint arXiv:1511.00561, 2015.

Barghout L. and Sheynin J., "Real-world scene perception and perceptual organization: Lessons from Computer Vision". Journal of Vision, 2013, vol. 13 (9). (Abstract).

Barghout L., "Visual Taxometric approach Image Segmentation using Fuzzy-Spatial Taxon Cut Yields Contextually Relevant Regions," Communications in Computer and Information Science (CCIS), Springer-Verlag, 2014, pp. 163-173.

Bay H., et al., "Surf: Speeded up Robust Features," European Conference on Computer Vision, Springer Berlin Heidelberg, 2006, pp. 404-417.

Beier et al., "Feature-Based Image Metamorphosis," in Computer Graphics Journal, Jul. 1992, vol. 26 (2), pp. 35-42.

Brainard R.C., et al., "Low-Resolution TV: Subjective Effects of Frame Repetition and Picture Replenishment," Bell Labs Technical Journal, Jan. 1967, vol. 46 (1), pp. 261-271.

Burt et al., "A Multiresolution Spline with Application to Image Mosaics," in ACM Transactions on Graphics (TOG), 1983, vol. 2, No. 4, pp. 217-236.

Chan T.F. and Vese LA., "Active contours without edges". IEEE Transactions on Image Processing, 2001, 10 (2), pp. 266-277 (hereinafter "Chan").

Chang H., et al., "Super-resolution Through Neighbor Embedding," Computer Vision and Pattern Recognition, 2004. CVPR 2004. Proceedings of the 2004 IEEE Computer Society Conference on, vol. 1, 2004.

Elen R., "Whatever happened to Ambisonics" AudioMedia Magazine, Nov. 1991.

Gracias N., et al., "Fast Image Blending Using Watersheds and Graph Cuts," Image and Vision Computing, 2009, vol. 27 (5), pp. 597-607.

Herbst E., et al., "Occlusion Reasoning for Temporal Interpolation Using Optical Flow," Department of Computer Science and Engineering, University of Washington, Tech. Rep. UW-CSE-09-08-01, 2009.

(56) References Cited

OTHER PUBLICATIONS

H.265 also known as High Efficiency Video Coding (HEVC), (described in e.g., ITU-T Study Group 16—Video Coding Experts Group (VCEG)—ITU-T H.265, and/or ISO/IEC JTC 1/SC 29/WG 11 Motion Picture Experts Group (MPEG)—the HEVC standard ISO/IEC 23008-2:2015.

H.264 (Jan. 2012) and/or ISO/IEC 14496-10:2012, Information technology—Coding of audio-visual objects—Part 10: Advanced Video Coding.

Jakubowski M., et al., "Block-based motion estimation algorithms—a survey," Opto-Electronics Review 21, No. 1 (2013), pp. 86-102.

Kendall A., et al., "Bayesian Segnet: Model Uncertainty in Deep Convolutional Encoder-Decoder Architectures for Scene Understanding," arXiv:1511.02680, 2015.

Lowe D.G., "Object Recognition From Local Scale-invariant Features," Computer vision, The proceedings of the seventh IEEE international conference on 1999, vol. 2, pp. 1150-1157.

Mitzel D., et al., "Video Super Resolution Using Duality Based TV-I 1 Optical Flow," Joint Pattern Recognition Symposium, 2009, pp. 432-441.

Pérez et al., "Poisson Image Editing," in ACM Transactions on Graphics (TOG), 2003, vol. 22, No. 3, pp. 313-318.

Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.

Schwartz, E., et al., "Implementation of Compression with Reversible Embedded Wavelets," In Proc. SPIE, 1995, 12 pages.

Suzuki et al., "Inter Frame Coding with Template Matching Averaging," in IEEE International Conference on Image Processing Proceedings (2007), vol. (III), pp. 409-412.

Szeliski R., "Computer vision: algorithms and applications," Springer Science & Business Media, 2010.

Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.

Vass, J., et al., "Efficient Three-Dimensional Wavelet Codecs for Networked Video Communication," in Proceedings of IEEE International Conference on Image Processing, Kobe, Japan, Oct. 1999, pp. 565-569.

Xiao, et al., Multiple View Semantic Segmentation for Street View Images, 2009 IEEE 12th International Conference on Computer Vision, 2009, pp. 686-693.

Xiong Y., et al., "Gradient Domain Image Blending and Implementation on Mobile Devices," International Conference on Mobile Computing, Applications, and Services, Springer Berlin Heidelberg, 2009, pp. 293-306.

Zhai et al., "A Low Complexity Motion Compensated Frame Interpolation Method," in IEEE International Symposium on Circuits and Systems (2005), pp. 4927-4930.

Zhang., "A Flexible New Technique for Camera Calibration" IEEE Transactions, dated Nov. 2000, vol. 22, No. 11, pp. 1330-1334.

* cited by examiner

SYSTEMS AND METHODS FOR SPATIALLY ADAPTIVE VIDEO ENCODING

PRIORITY

This application claims the benefit of priority to U.S. Provisional Patent Application Ser. No. 62/294,925 filed Feb. 12, 2016 of the same title, the contents of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to storing and/or presenting of image and/or video content and more particularly in one exemplary aspect to encoding, decoding, and/or transmission of panoramic spherical video content.

Description of Related Art

Virtual reality (VR) video content and/or panoramic video content may include bitstreams characterized by high data rates, e.g., in excess of 10 megabits per second (mbps). A user may wish to view high data rate content on a resource limited device (e.g., battery operated computer (e.g., a tablet, a smartphone)) and/or other device that may be characterized by a given amount of available energy, data transmission bandwidth, and/or computational capacity. Resources available to such resource limited device may prove inadequate for receiving and/or decoding full resolution and/or full frame image content.

SUMMARY

The present disclosure satisfies the foregoing needs by providing, inter alfa, methods and apparatus for provision of captured content in a manner that addresses the processing capabilities of a resource limited device.

In a first aspect, a system for providing video content is disclosed. In one embodiment, the system includes an electronic storage configured to store the video content, the video content including a high bitrate image; a communications interface configured to communicate a bit stream associated with the stored video content to a client device; and one or more physical processors configured to execute a plurality of computer readable instructions. The plurality of computer readable instructions when executed by the one or more physical processors is configured to: access the high bitrate image; partition the high bitrate image into image portions based at least in part on a dimension of a viewport, the image portions comprising a first image portion and a second image portion; obtain quality distributions corresponding to the image portions, the quality distributions including a first quality distribution corresponding to the first image portion and a second quality distribution corresponding to the second image portion; encode the first image portion and the second image portion using the corresponding first and second quality distributions, the encoding of the first image portion and the second image portion resulting in an enhanced quality level for the first image portion and the second image portion; receive a viewport position from the viewport, the viewport position associated with the first image portion; provide the encoded first image portion at the enhanced quality level associated with the first quality distribution; and provide the remainder of the high bitrate image at a baseline quality level, the baseline quality level being less than the enhanced quality level.

In one variant, the computer readable instructions when executed by the one or more physical processors is further configured to: receive a second viewport position from the viewport, the second viewport position associated with the second image portion; transition from provision of the encoded first image portion to provision of the encoded second image portion; provide the encoded second image portion at the enhanced quality level associated with the second quality distribution; and provide the remainder of the high bitrate image at the baseline quality level, the baseline quality level being less than the enhanced quality level.

In another variant, the enhanced quality level further includes a gradual transition area, the gradual transition area transitioning from the enhanced quality level to the baseline quality level.

In yet another variant, the enhanced quality level is characterized by a first range of quantization parameters, the gradual transition area is characterized by a second range of quantization parameters, and the baseline quality level is characterized by a third range of quantization parameters, an average of the first range of quantization parameters being less than an average of the second range of quantization parameters and the average of the second range of quantization parameters being less than an average of the third range of quantization parameters.

In yet another variant, the computer readable instructions when executed by the one or more physical processors is further configured to: receive a viewport position change from the viewport; determine whether the viewport position change exceeds a threshold value; when the viewport position change exceeds the threshold value, provide a differing encoded image portion at the enhanced quality level, the differing encoded image portion being different than the encoded first image portion; and when the viewport position change does not exceed the threshold value, continue to provide the encoded first image portion at the enhanced quality level associated with the first quality distribution.

In yet another variant, the computer readable instructions when executed by the one or more physical processors is further configured to: adjust the threshold value, the adjustment of the threshold value is configured to reduce latencies associated with the provision of encoded image portions.

In yet another variant, the gradual transition area is configured to reduce latencies associated with the provision of encoded image portions.

In yet another variant, the high bit image comprises panoramic content and the received viewport position is associated with a portion of the panoramic content.

In yet another variant, the enhanced quality level for the first image portion comprises a first gradual transition area, the first gradual transition area transitioning from the enhanced quality level for the first image portion to the baseline quality level and the enhanced quality level for the second image portion comprises a second gradual transition area, the second gradual transition area transitioning from the enhanced quality level for the second image portion to the baseline quality level and the first gradual transition area and the second gradual transition at least partly overlap within the panoramic content.

In a second aspect, a computing device is disclosed. In one embodiment, the computing device includes logic configured to: encode a first portion of a panoramic image using a first quality distribution; encode a second portion of the panoramic image using a second quality distribution; obtain a position change of a viewport, the changed position of the viewport corresponding to a determined change from a first viewport location to a second viewport location; determine whether the position change of the viewport exceeds a threshold value; responsive to a determination that the position change of the viewport exceeds the threshold value, provide at least a portion of the panoramic image using the second quality distribution; and responsive to a determination that the position change does not exceed the threshold value, provide at least a portion of the panoramic image encoded using the first quality distribution.

In one variant, the computing device further includes logic configured to: access the panoramic image; partition the panoramic image into image portions based at least in part on a dimension of a viewport, the image portions comprising a first image portion encoded using the first quality distribution and a second image portion encoded using the second quality distribution.

In another variant, the partition of the panoramic image into image portions is configured to enable provision of higher quality content as compared with a computing device that provides in-time quality encoding.

In yet another variant, the partition of the panoramic image into image portions is configured to enable provision of imaging content with a reduced latency as compared with a computing device that provides in-time quality encoding.

In yet another variant, the computing device further includes logic configured to: store a first encoded representation of the panoramic image using the first quality distribution; and store a second encoded representation of the panoramic image using the second quality distribution.

In yet another variant, the first and second encoded representations are each associated with respective enhanced quality portions located within distinct physical portions of the panoramic image.

In yet another variant, the storage of the first encoded representation of the panoramic image and the storage of the second encoded representation of the panoramic image enables the provision of higher quality content and/or provision of imaging content with a reduced latency as compared with a computing device that provides in-time quality encoding.

In a third aspect, a method for providing video content is disclosed. In one embodiment, the method includes: encoding a portion of a panoramic image using a first quality distribution; obtaining a position change of a viewport, the changed position of the viewport corresponding to a part of the portion of the panoramic image; determining whether the position change of the viewport exceeds a threshold value; responsive to a determination that the position change of the viewport exceeds the threshold value, encoding at least the part of the portion of the panoramic image using a second quality distribution and providing at least the part of the portion of the panoramic image encoded using the second quality distribution; and responsive to a determination that the position change does not exceed the threshold value, providing at least the part of the portion of the panoramic image encoded using the first quality distribution.

In one variant, the encoding of the portion of the panoramic image using the first quality distribution further includes encoding using a spatially varying quality of encoding for the portion of the panoramic image, the spatially varying quality of encoding comprising an enhanced quality portion and a transitional quality portion, the transitional quality portion varying the encoding quality from the enhanced quality portion to a baseline quality portion.

In another variant, when the determination that the position change of the viewport exceeds the threshold value, the method further includes switching from providing the portion of the panoramic image encoded using the first quality distribution for a prior viewport position to providing the portion of the panoramic image encoded using the second quality distribution associated with the changed position of the viewport.

In yet another variant, the method further includes predicting a future viewport position, the predicted future viewport position being determined based at least in part on the changed position of the viewport and the prior viewport position.

In a fourth aspect of the present disclosure, a computer readable storage apparatus is disclosed. In one embodiment, the computer readable storage apparatus includes a non-transitory computer readable medium having instructions which are configured to, when executed by a processing apparatus, cause a computerized apparatus to: access a high bitrate image; partition the high bitrate image into image portions based at least in part on a dimension of a viewport, the image portions comprising a first image portion and a second image portion; obtain quality distributions corresponding to the image portions, the quality distributions including a first quality distribution corresponding to the first image portion and a second quality distribution corresponding to the second image portion; encode the first image portion and the second image portion using the corresponding first and second quality distributions, the encoding of the first image portion and the second image portion resulting in an enhanced quality level for the first image portion and the second image portion; receive a viewport position from the viewport, the viewport position associated with the first image portion; provide the encoded first image portion at the enhanced quality level associated with the first quality distribution; and provide the remainder of the high bitrate image at a baseline quality level, the baseline quality level being less than the enhanced quality level.

In a fifth aspect of the present disclosure, an integrated circuit (IC) apparatus is disclosed. In one embodiment, the IC includes logic configured to: encode a first portion of a panoramic image using a first quality distribution; encode a second portion of the panoramic image using a second quality distribution; obtain a position change of a viewport, the changed position of the viewport corresponding to a determined change from a first viewport location to a second viewport location; determine whether the position change of the viewport exceeds a threshold value; responsive to a determination that the position change of the viewport exceeds the threshold value, provide at least a portion of the panoramic image using the second quality distribution; and responsive to a determination that the position change does not exceed the threshold value, provide at least a portion of the panoramic image encoded using the first quality distribution.

Other features and advantages of the present disclosure will immediately be recognized by persons of ordinary skill in the art with reference to the attached drawings and detailed description of exemplary implementations as given below.

All Figures disclosed herein are © Copyright 2016 GoPro Inc. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations are possible by way of interchange of or combination with some or all of the described or illustrated elements. Wherever convenient, the same reference numbers will be used throughout the drawings to refer to same or like parts.

Systems and methods for providing video content using spatially adaptive coding quality are provided. Panoramic content (e.g., content captured using 180 degree, 360-degree view field and/or other fields of view) and/or virtual reality (VR) content, may be characterized by high image resolution (e.g., 1100 pixels by 3000 pixels (8K)) and/or high bit rates (e.g., in excess of 100 megabits per second (mbps)). Presently available standard video compression codecs, e.g., H.264 (described in ITU-T H.264 (01/2012) and/or ISO/IEC 14496-10:2012, Information technology—Coding of audio-visual objects—Part 10: Advanced Video Coding, each of the foregoing incorporated herein by reference in its entirety), High Efficiency Video Coding (HEVC), also known as H.265 (described in e.g., ITU-T Study Group 16—Video Coding Experts Group (VCEG)—ITU-T H.265, and/or ISO/IEC JTC 1/SC 29/WG 11 Motion Picture Experts Group (MPEG)—the HEVC standard ISO/IEC 23008-2:2015, each of the foregoing incorporated herein by reference in its entirety), and/or VP9 video codec (described at e.g., http://www.webmproject.org/vp9, the foregoing incorporated herein by reference in its entirety), may prove non-optimal for providing a viewport portion of the panoramic and/or VR content to resource limited devices.

When viewing panoramic and/or VR content using a viewport, a server may provide (and the decoder may decode) a portion of a high resolution video. The area where a viewer may be looking may be characterized by higher fidelity (e.g., higher resolution); rest of the panoramic image may be characterized by lower fidelity (e.g., lower resolution). When the viewer moves his/her viewport, the decoder may request transmission of video data corresponding to updated viewport window. Methodology of the disclosure may enable provision of higher fidelity content for a viewport using lower bandwidth and/or decoder computational and/or energy resources compared to existing solutions.

Figure 3:
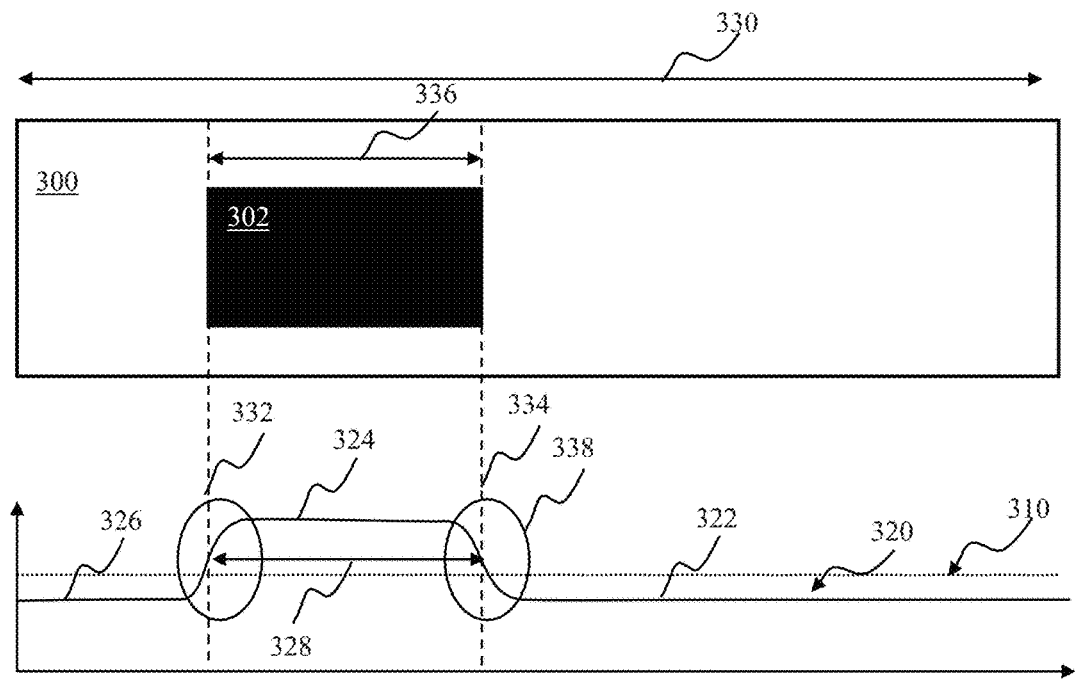
FIG. 3 is a graphical illustration depicting use of spatially adaptive encoding quality distribution for encoding viewport of a panoramic image in accordance with the principles of the present disclosure.

Panoramic and/or virtual reality content may be viewed by a client device (e.g., device 120 in FIG. 1A and/or 620 in FIG. 6) using a viewport into the extent of the panoramic image, such as shown in FIG. 3 and described herein. In some implementations, viewing dimension(s) of the viewport 302 may be configured smaller than the extent dimension(s) of the content (e.g., a viewport covering area of 1000 pixels in width and 700 pixels in height may be used to view content that was obtained using image 300 with dimensions greater than the dimensions of viewport 302, e.g., between 4000 pixels to 8000 pixels in width and 2000 to 4000 pixels in height). The client device may include a portable media device characterized by given amount of energy and/or computational resources (e.g., battery operated device).

Content delivery methodology of the present disclosure may be utilized for facilitating VR content delivery, video conferencing, in-game video streaming, immersive experience when viewing spherical (e.g., 360 degree content), and/or other applications.

Figure 1A:
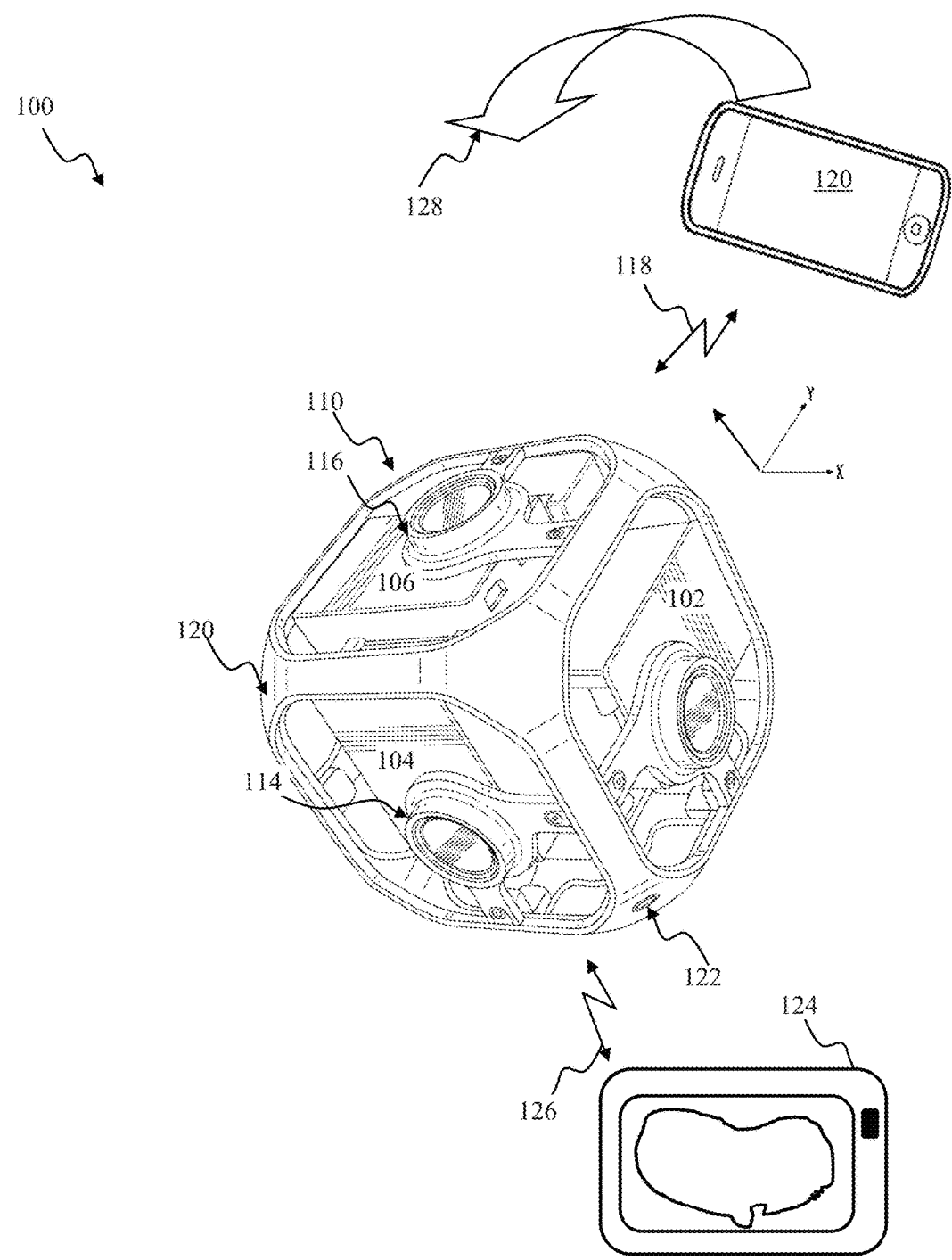
FIG. 1A illustrates a system for content capture and viewing in accordance with the principles of the present disclosure.

FIG. 1A illustrates an exemplary capture system configured for acquiring panoramic content, in accordance with one implementation. The system 100 of FIG. 1A may include capture apparatus 110, e.g., such as GoPro activity camera, e.g., HERO4 Silver, and/or other image capture devices.

The capture apparatus 110 may include 6-cameras (e.g., 104, 106, 102) disposed in a cube-shaped cage 120. The cage 120 dimensions may be selected between 25 mm and 150 mm, preferably 105 mm in some implementations. The cage 120 may be outfitted with a mounting port 122 configured to enable attachment of the camera to a supporting structure (e.g., a tripod, a photo stick). The cage 120 may provide a rigid support structure. Use of a rigid structure may ensure that orientation of individual cameras with respect to one another may remain at a given configuration during operation of the apparatus 110.

Individual capture devices (e.g., 102) may comprise a video camera device, such as described in, e.g., such as described in U.S. patent application Ser. No. 14/920,427 entitled "APPARATUS AND METHODS FOR EMBEDDING METADATA INTO VIDEO STREAM" filed on 22 Oct., 2015, the foregoing being incorporated herein by reference in its entirety.

In some implementations, the capture device may include two camera components (including a lens and imaging sensors) that are disposed in a Janus configuration, e.g., back to back such as described in U.S. patent application Ser. No. 29/548,661, entitled "MULTI-LENS CAMERA" filed on 15 Dec., 2015, the foregoing being incorporated herein by reference in its entirety.

The capture apparatus 110 may be configured to obtain imaging content (e.g., images and/or video) with 360° field of view, also referred to as panoramic or spherical content, e.g., such as shown and described in U.S. patent application Ser. No. 14/949,786, entitled "APPARATUS AND METHODS FOR IMAGE ALIGNMENT" filed on 23 Nov., 2015, and/or U.S. patent application Ser. No. 14/927,343, entitled "APPARATUS AND METHODS FOR ROLLING SHUTTER COMPENSATION FOR MULTI-CAMERA SYSTEMS", filed 29 Oct. 2015, each of the foregoing being incorporated herein by reference in its entirety.

Individual cameras (e.g., 102, 104, 106) may be characterized by field of view 120° in longitudinal dimension and 90° in latitudinal dimension. In order to provide for an increased overlap between images obtained with adjacent cameras, image sensors of any two adjacent cameras may be configured at 90° with respect to one another. By way non-limiting illustration, longitudinal dimension of camera 102 sensor may be oriented at 90° with respect to longitudinal dimension of the camera 104 sensor; longitudinal dimension of camera 106 sensor may be oriented at 90° with respect to longitudinal dimension 116 of the camera 104 sensor. Camera sensor configuration illustrated in FIG. 1A, may provide for 420° angular coverage in vertical and/or horizontal planes. Overlap between fields of view of adjacent cameras may provide for an improved alignment and/or stitching of multiple source images to produce, e.g., a panoramic image, particularly when source images may be obtained with a moving capture device (e.g., rotating camera).

Individual cameras of the apparatus 110 may comprise a lens e.g., lens 114 of the camera 104, lens 116 of the camera 106. In some implementations, the individual lens may be characterized by what is referred to as fisheye pattern and produce images characterized by fish eye (or near-fish eye) field of view (FOV). Images captured by two or more individual cameras of the apparatus 110 may be combined using stitching of fisheye projections of captured images to produce an equirectangular planar image, in some implementations, e.g., such as shown in U.S. patent application Ser. No. 14/920,427entitled "APPARATUS AND METHODS FOR EMBEDDING METADATA INTO VIDEO STREAM" filed on 22 Oct., 2015, incorporated supra.

The capture apparatus 110 may house one or more internal metadata sources, e.g., video, inertial measurement unit, global positioning system (GPS) receiver component and/or other metadata source. In some implementations, the capture apparatus 110 may comprise a device described in detail in U.S. patent application Ser. No. 14/920,427, entitled "APPARATUS AND METHODS FOR EMBEDDING METADATA INTO VIDEO STREAM" filed on 22 Oct., 2015, incorporated supra. The capture apparatus 110 may comprise one or optical elements 102. Individual optical elements 116 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical elements.

The capture apparatus 110 may include one or more image sensors including, by way of non-limiting example, one or more of charge-coupled device (CCD) sensor, active pixel sensor (APS), complementary metal-oxide semiconductor (CMOS) sensor, N-type metal-oxide-semiconductor (NMOS) sensor, and/or other image sensors. The capture apparatus 110 may include one or more microphones configured to provide audio information that may be associated with images being acquired by the image sensor.

The capture apparatus 110 may be interfaced to an external metadata source 124 (e.g., GPS receiver, cycling computer, metadata puck, and/or other device configured to provide information related to system 100 and/or its environment) via a remote link 126. The capture apparatus 110 may interface to an external user interface device 120 via the link 118. In some implementations, the device 120 may correspond to a smartphone, a tablet computer, a phablet, a smart watch, a portable computer, and/or other device configured to receive user input and communicate information with the camera capture device 110. In some implementation, the capture apparatus 110 may be configured to provide panoramic content (or portion thereof) to the device 120 for viewing.

In one or more implementations, individual links 126, 118 may utilize any practical wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, individual links 126, 118 may be effectuated using a wired interface, e.g., HDMI, USB, digital video interface, display port interface (e.g., digital display interface developed by the Video Electronics Standards Association (VESA), Ethernet, Thunderbolt), and/or other interface.

In some implementations (not shown) one or more external metadata devices may interface to the apparatus 110 via a wired link, e.g., HDMI, USB, coaxial audio, and/or other interface. In one or more implementations, the capture apparatus 110 may house one or more sensors (e.g., GPS, pressure, temperature, heart rate, and/or other sensors). The metadata obtained by the capture apparatus 110 may be incorporated into the combined multimedia stream using any applicable methodologies including those described in U.S. patent application Ser. No. 14/920,427 entitled "APPARATUS AND METHODS FOR EMBEDDING METADATA INTO VIDEO STREAM" filed on 22 Oct., 2015, incorporated supra.

The user interface device 120 may operate a software application (e.g., GoPro Studio, GoPro App, and/or other application) configured to perform a variety of operations related to camera configuration, control of video acquisition, and/or display of video captured by the camera apparatus 110. An application (e.g., GoPro App) may enable a user to create short video clips and share clips to a cloud service (e.g., Instagram, Facebook, YouTube, Dropbox); perform full remote control of camera 110 functions, live preview video being captured for shot framing, mark key moments while recording with HiLight Tag, View HiLight Tags in GoPro Camera Roll for location and/or playback of video highlights, wirelessly control camera software, and/or perform other functions. Various methodologies may be utilized for configuring the camera apparatus 110 and/or displaying the captured information, including those described in U.S. Pat. No. 8,606,073, entitled "BROADCAST MANAGEMENT SYSTEM", issued December 10, 2013, the foregoing being incorporated herein by reference in its entirety.

By way of an illustration, the device 120 may receive user setting characterizing image resolution (e.g., 3840 pixels by 2160 pixels), frame rate (e.g., 60 frames per second (fps)), and/or other settings (e.g., location) related to the activity (e.g., mountain biking) being captured. The user interface device 120 may communicate the settings to the camera apparatus 110.

A user may utilize the device 120 to view content acquired by the capture apparatus 110. Display of the device 120 may act as a viewport into 3D space of the panoramic content. In some implementation, the user interface device 120 may communicate additional information (e.g., metadata) to the camera apparatus 110. By way of an illustration, the device 120 may provide orientation of the device 120 with respect to a given coordinate system, to the apparatus 110 so as to enable determination of a viewport location and/or dimensions for viewing of a portion of the panoramic content. By way of an illustration, a user may rotate (e.g., sweep) the device 120 through an arc in space (as illustrated by arrow 128 in FIG. 1A). The device 120 may communicate display orientation information to the capture apparatus 110. The capture apparatus 110 may provide an encoded bitstream configured to enable viewing of a portion of the panoramic content corresponding to a portion of the environment of the display location as it traverses the path 128.

The capture apparatus 110 may include a display configured to provide information related to camera operation mode (e.g., image resolution, frame rate, capture mode (sensor, video, photo), connection status (connected, wireless, wired connection), power mode (e.g., standby, sensor mode, video mode), information related to metadata sources (e.g., heart rate, GPS), and/or other information. The capture apparatus 110 may include a user interface component (e.g., one or more buttons) configured to enable user to start, stop, pause, resume sensor and/or content capture. User commands may be encoded using a variety of approaches including but not limited to duration of button press (pulse width modulation), number of button presses (pulse code modulation) and/or a combination thereof. By way of an illustration, two short button presses may initiate sensor acquisition mode described in detail elsewhere; single short button press may be used to (i) communicate initiation of video and/or photo capture and cessation of video and/or photo capture (toggle mode); or (ii) video and/or photo capture for a given time duration or number of frames (burst capture). It will be recognized by those skilled in the arts that various user command communication implementations may be realized, e.g., short/long button presses.

Figure 1B:
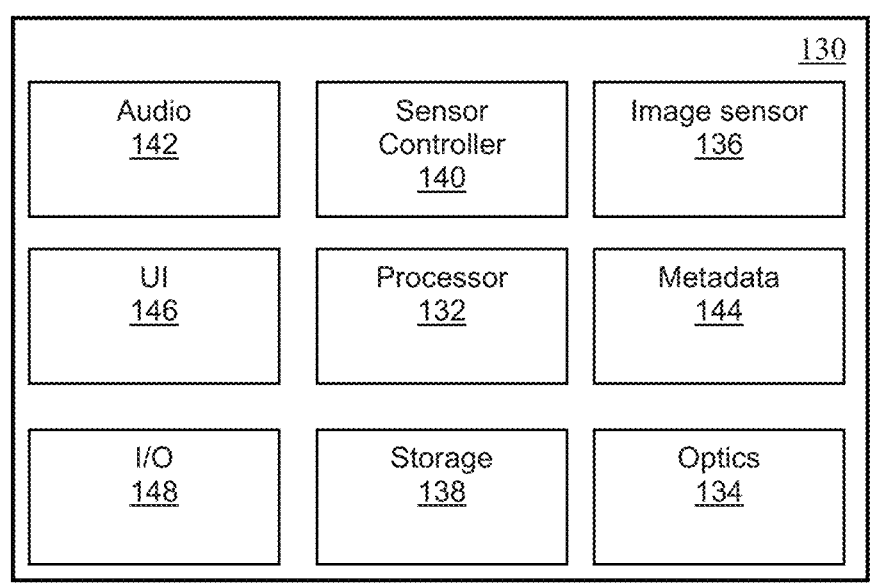
FIG. 1B is a functional block diagram illustrating a capture device for use with, for example, the system of FIG. 1A in accordance with the principles of the present disclosure.

FIG. 1B illustrates one implementation of a camera apparatus for collecting metadata and content. The apparatus of FIG. 1B may comprise a capture device 130 that may include one or more processors 132 (such as system on a chip (SOC), microcontroller, microprocessor, CPU, DSP, ASIC, GPU, and/or other processors) that control the operation and functionality of the capture device 130. In some implementations, the capture device 130 in FIG. 1B may correspond to an action camera configured to capture photo, video and/or audio content.

The capture device 130 may include an optics module 134. In one or more implementations, the optics module 134 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations the optics module 134 may implement focus controller functionality configured to control the operation and configuration of the camera lens. The optics module 134 may receive light from an object and couple received light to an image sensor 136. The image sensor 136 may include, by way of non-limiting example, one or more of charge-coupled device sensor, active pixel sensor, complementary metal-oxide semiconductor sensor, N-type metal-oxide-semiconductor sensor, and/or other image sensor. The image sensor 136 may be configured to capture light waves gathered by the optics module 134 and to produce image(s) data based on control signals from the sensor controller module 140. Optics module 134 may comprise focus controller configured to control the operation and configuration of the lens. The image sensor may be configured to generate a first output signal conveying first visual information regarding the object. The visual information may include, by way of non-limiting example, one or more of an image, a video, and/or other visual information. The optical element, and the first image sensor may be embodied in a housing.

In some implementations, the image sensor module 136 may include, without limitation, video sensors, audio sensors, capacitive sensors, radio sensors, vibrational sensors, ultrasonic sensors, infrared sensors, radar, LIDAR and/or sonars, and/or other sensory devices.

The apparatus 130 may include one or more audio components (e.g., microphone(s) embodied within the camera (e.g., 142). Microphones may provide audio content information.

The apparatus 130 may include a sensor controller module 140. The sensor controller module 140 may be used to operate the image sensor 136. The sensor controller module 140 may receive image or video input from the image sensor 136; audio information from one or more microphones, such as 142. In some implementations, audio information may be encoded using audio coding format, e.g., AAC, AC3, MP3, linear PCM, MPEG-H and or other audio coding format (audio codec). In one or more implementations of spherical video and/or audio, the audio codec may comprise a 3-dimensional audio codec, e.g., Ambisonics such as described at http://www.ambisonic.net/ and/or http://www.digitalbrainstorming.ch/db_data/eve/ambisonics/text01.pdf, the foregoing being incorporated herein by reference in its entirety.

The apparatus 130 may include one or more metadata modules embodied (e.g., 144) within the camera housing and/or disposed externally to the camera. The processor 132 may interface to the sensor controller and/or one or more metadata modules 144. Metadata module 144 may include sensors such as an inertial measurement unit (IMU) including one or more accelerometers and/or gyroscopes, a magnetometer, a compass, a global positioning system (GPS) sensor, an altimeter, ambient light sensor, temperature sensor, and/or other sensors. The capture device 130 may contain one or more other metadata/telemetry sources, e.g., image sensor parameters, battery monitor, storage parameters, and/or other information related to camera operation and/or capture of content. Metadata module 144 may obtain information related to environment of the capture device and aspect in which the content is captured. By way of a non-limiting example, an accelerometer may provide device motion information, comprising velocity and/or acceleration vectors representative of motion of the capture device 130; the gyroscope may provide orientation information describing the orientation of the device 130, the GPS sensor may provide GPS coordinates, time, identifying the location of the device 130; and the altimeter may obtain the altitude of the camera 130. In some implementations, internal metadata module 144 may be rigidly coupled to the capture device 130 housing such that any motion, orientation or change in location experienced by the device 130 is also experienced by the metadata sensors 144. The sensor controller module 140 and/or processor 132 may be operable to synchronize various types of information received from the metadata sources. For example, timing information may be associated with the sensor data. Using the timing information metadata information may be related to content (photo/video) captured by the image sensor 136. In some implementations, the metadata capture may be decoupled form video/image capture. That is, metadata may be stored before, after, and in-between one or more video clips and/or images. In one or more implementations, the sensor controller module 140 and/or the processor 132 may perform operations on the received metadata to generate additional metadata information. For example, the microcontroller may integrate the received acceleration information to determine the velocity profile of the capture device 130 during the recording of a video. In some implementations, video information may consist of multiple frames of pixels using any applicable encoding method (e.g., H262, H.264, Cineform and/or other standard).

The apparatus 130 may include electronic storage 138. The electronic storage 138 may comprise a system memory module is configured to store executable computer instructions that, when executed by the processor 132, perform various camera functionalities including those described herein. The electronic storage 138 may comprise storage memory configured to store content (e.g., metadata, images, audio) captured by the apparatus.

The electronic storage 138 may include non-transitory memory configured to store configuration information and/or processing code configured to enable, e.g., video information, metadata capture and/or to produce a multimedia stream comprised of, e.g., a video track and metadata in accordance with the methodology of the present disclosure. In one or more implementations, the processing configuration may comprise capture type (video, still images), image resolution, frame rate, burst setting, white balance, recording configuration (e.g., loop mode), audio track configuration, and/or other parameters that may be associated with audio, video and/or metadata capture. Additional memory may be available for other hardware/firmware/software needs of the apparatus 130. The processor 132 may interface to the sensor controller module 140 in order to obtain and process sensory information for, e.g., object detection, face tracking, stereo vision, and/or other tasks.

The processor 132 may interface with the mechanical, electrical sensory, power, and user interface 146 modules via driver interfaces and/or software abstraction layers. Additional processing and memory capacity may be used to support these processes. It will be appreciated that these components may be fully controlled by the processor 132. In some implementation, one or more components may be operable by one or more other control processes (e.g., a GPS receiver may comprise a processing apparatus configured to provide position and/or motion information to the processor 132 in accordance with a given schedule (e.g., values of latitude, longitude, and elevation at 10 Hz)).

The memory and processing capacity may aid in management of processing configuration (e.g., loading, replacement), operations during a startup, and/or other operations. Consistent with the present disclosure, the various components of the system may be remotely disposed from one another, and/or aggregated. For example, one or more sensor components may be disposed distal from the capture device, e.g., such as shown and describe with respect to FIG. 1A. Multiple mechanical, sensory, or electrical units may be controlled by a learning apparatus via network/radio connectivity.

The apparatus 130 may include user interface (UI) module 146. The UI module 146 may comprise any type of device capable of registering inputs from and/or communicating outputs to a user. These may include, without limitation, display, touch, proximity sensitive interface, light, sound receiving/emitting devices, wired/wireless input devices and/or other devices. The UI module 146 may include a display, one or more tactile elements (e.g., buttons and/or virtual touch screen buttons), lights (LED), speaker, and/or other UI elements. The UI module 146 may be operable to receive user input and/or provide information to a user related to operation of the camera apparatus 130.

The apparatus 130 may include an input/output (I/O) interface module 148. The I/O interface module 148 may be configured to synchronize the capture device 130 with other cameras and/or with other external devices, such as a remote control, a second capture device 130, a smartphone, a client device 120 of FIG. 1A and/or a video server. The I/O interface module 148 may be configured to communicate information to/from various I/O components. In some implementations the I/O interface module 148 may comprise a wired and/or wireless communications interface (e.g. WiFi, Bluetooth, USB, HDMI, Wireless USB, Near Field Communication (NFC), Ethernet, a radio frequency transceiver, and/or other interfaces) configured to communicate to one or more external devices (e.g., devices 124, 122, 120 in FIG. 1A and/or metadata source). In some implementations, the I/O interface module 148 may interface with LED lights, a display, a button, a microphone, speakers, and/or other I/O components. In one or more implementations, the I/O interface module 148 may interface to energy source, e.g., battery and/or DC electrical source. The communications interface of the apparatus 130 may include one or more connections to external computerized devices to allow for, inter alia, configuration and/or management of remote devices e.g., as described above with respect to FIG. 1A and/or with respect to FIGS. 2A-2B. The connections may include any of the wireless or wireline interfaces discussed above, and further may include customized or proprietary connections for specific applications. In some implementations, the communications interface may comprise a component (e.g., a dongle), comprising an infrared sensor, a radio frequency antenna, ultrasonic transducer, and/or other communications interfaces. In one or more implementation, the communications interface may comprise a local (e.g., Bluetooth, Wi-Fi) and/or broad range (e.g., cellular LTE) communications interface configured to enable communications between the capture device (e.g., 110 in FIG. 1A) and a remote device (e.g., 120 in FIG. 1A).

The apparatus 130 may include a power system that may be tailored to the needs of the application of the device. For example, for a small-sized lower power action camera, a wireless power solution (e.g. battery, solar cell, inductive (contactless) power source, rectification, and/or other) may be used.

Figure 2:
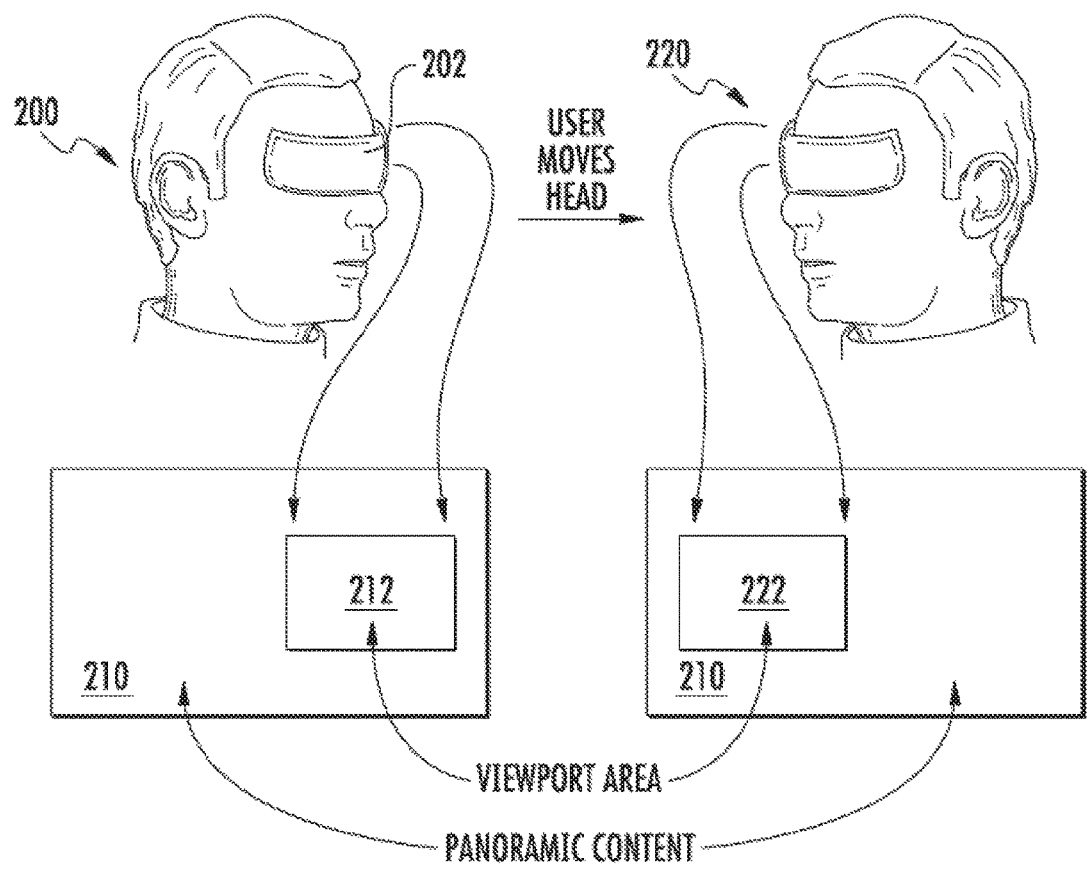
FIG. 2 is a graphical illustration depicting viewport change when viewing panoramic and/or virtual reality content in accordance with the principles of the present disclosure.

FIG. 2 illustrates viewport change when viewing panoramic content, in accordance with one implementation. In some implementations a user may view panoramic content using a virtual reality (VR) headset, 202 in FIG. 2. The headset 202 may include a sensor configured to provide information related to orientation and/or motion of the headset 202. In some implementations, the sensor may include an accelerometer, a tilt sensor, a compass, a heading sensor, a gyroscope, and/or other sensors.

When the headset 202 is pointing in a given direction, e.g., as shown in panel 200 in FIG. 2, the viewport associated with the position of headset 202 may be denoted by area 212 within the panoramic image frame 210. As used herein the terms "viewport" and/or "view area" may be used to describe a portion of view field of the captured content that may be used for viewing panoramic content that may be characterized by content view field (e.g., shown by frame 210 in FIG. 2). When panoramic content is presented on a two dimensional display device, the viewport may denote a two dimensional area (e.g., 212) within the 2 dimensional projection of the acquired panoramic content (frame 210).

When providing a portion of the panoramic content (e.g., viewport 212) to a client device, a portion of the content corresponding to the present viewport may be encoded, transmitted, and/or decoded by the client device. When providing and/or consuming content, it may be of benefit to reduce load on a content server, transmission resource (e.g., bandwidth, energy) utilization, and/or client device decoder load (e.g., energy use by the decoder). Viewport changes may necessitate content bitstream adjustment. By way of an illustration, as head of the user moves from configuration 200 to configuration 220 in FIG. 2, the viewport may change, e.g., from area 212 to area 222 within the panoramic content frame 210. Accordingly, the content providing entity (e.g., content server) may need to transition from providing bitstream for content within the area 212 to content associated with the area 222.

FIGS. 3-5B illustrate spatially adaptive video encoding /decoding methodology that may enable provision and/or viewing of panoramic content using reduced computational, energy, transmission bandwidth resources.

FIG. 3 illustrates use of spatially adaptive encoding quality distribution for encoding viewport of a panoramic image, in accordance with one implementation.

Frame 300 in FIG. 3 may represent a panoramic image obtained using one or more capture devices (e.g., 120, 130 in FIGS. 1A-1B). In some implementations, the image 300 may correspond to equirectangular projection of multiple images obtained with the 6-lens capture device, e.g., such as described in U.S. patent application Ser. No. 14/927,343 entitled "APPARATUS AND METHODS FOR ROLLING SHUTTER COMPENSATION FOR MULTI-CAMERA SYSTEMS" filed on 29 Oct., 2015, incorporated supra. Image 300 may be characterized by longitudinal dimension 330. In some implementations of spherical and/or panoramic content the dimension 330 may correspond to a wide angle field of view, e.g., between 160° and 360°. Dimension 330 may be configured to exceed 2000 pixels, e.g., 8000 pixels in some implementations.

A portion of the frame 300 content (e.g., viewport 302) may be provided to one or more client devices (e.g., streamed to mobile phones). The viewport 302 may be characterized by longitudinal dimension 336 configured to represent a portion of the native frame dimension 330. In some implementations, the portion dimension 336 may be configured between 5% and 50% of the native frame dimension 330, e.g., 25% as shown in FIG. 3.

Content provided for the viewport 302 may be encoded using any applicable video distribution codec, e.g. H.264, HEVC, V9, and/or other codec. In some implementations, content corresponding to the viewport may be encoded using a standard level of quality for the frame 300, denoted by broken line 310 in FIG. 3. In one or more implementations, the encoding quality may be characterized by objective visual quality metrics, such as mean square error (MSE), the peak signal to noise ratio (PSNR), structural similarity (SSIM) and/or other metrics. The MSE may represent the cumulative squared error between the compressed and the original image, whereas PSNR may represent a measure of the peak error. In some implementations, subjective quality obtained by way of mean opinion score (MOS). Various encoder parameters may be used to configure encoding quality, bitrate, and/or encoding computational efficiency. This includes, but is not limited to quantization parameters (which could include QP and/or dead zone); de-blocking filter strengths, adapting portioning of slices and/or tiles, dynamically adjusting motion vector search range, transform mode selection, and/or encoder output bitrate. In some implementations of encoding panoramic content, encoder output bitrate for content of frame 300 may be selected from the range between 10 mbps and 200 mbps, e.g., 100 mbps.

Video encoding process may be characterized by quality, computational load (e.g., number of computer operations to encode a unit of a video (e.g., frame), and bitrate. In some implementations, a video encoder may be configured to obtain an optimal encoding output based on optimization of one or more of these parameters (e.g., quality, computational load, and bitrate). By way of an illustration, an encoder implementation may be configured to obtain the highest attainable quality for a given bitrate value (e.g., 100 mbps), and given available computational resources (e.g., such as available to a battery operated mobile computing device). In order to reduce the overall amount of computations and/or data transmission for a given quality, and/or improve quality for a given amount of transmitted data, spatially adaptive encoding may be utilized as described herein.

Curve 320 denotes one exemplary implementation of spatially varying quality of encoding of content of frame 300. Portion of the frame 300 between vertical lines 332, 334 may be encoded using an increased level of quality (e.g., as described by encoding parameters) as compared to portions of the frame 300 to the right of the line 334 and to the left of the line 332 in FIG. 3. This may be illustrated by an increased visual quality of portion 324 relative to quality level of portions 322, 326 for images encoded using the curve 320. Quality level of portions 322, 326 of curve 320 may be referred to as base quality level; quality level of portion 324 of curve 320 may be referred to as enhanced quality level. In some implementations, the base quality level of curve 320 may be configured below quality level 310 for encoding the overall frame 300, as shown in FIG. 3. In one or more implementations, the base quality level of curve 320 may be configured equal or may exceed quality level 310; the enhanced quality level of curve 320 may be configured to exceed quality level 310. Encoder quality distribution of curve 320 may include portions (e.g., 338) characterized by gradual quality transition from enhanced quality level 324 to the baseline level 322. Smoothness of the transition may be effectuated using Gaussian process, cosine process and/or other process characterized by value of a derivative of the quality with respect to spatial coordinate (e.g., 330) below a given threshold. Use of gradual transition may enable provision of very high quality encoded content for portion of the image 300 wherein the viewer may be viewing the content (e.g., the viewport middle 60% to 90%), good quality when the viewport 302 may be displaced horizontally within a given limit, e.g., between 1% and 30% of the viewport width 336 in some implementations, within the native window dimension 330.

Longitudinal extent 328 of the enhanced quality portion of the encoding curve 320 may be configured based on the longitudinal extent 336 of the viewport 302. In some implementations, the dimension 328 may exceed dimension 336 by a factor selected between 1.01 and 1.5.

Figure 4:
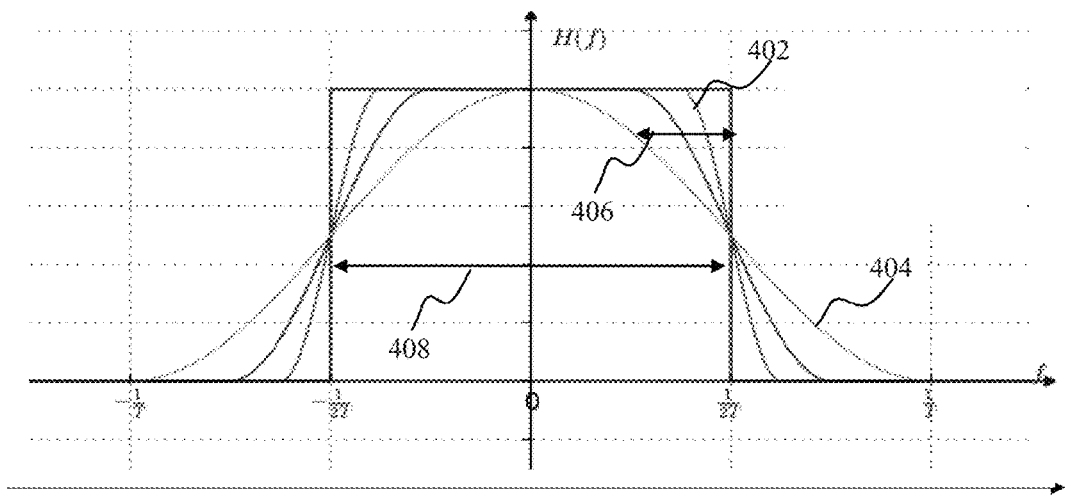
FIG. 4 is a plot depicting exemplary spatial quality distributions for use with content encoding methodology in accordance with the principles of the present disclosure.

Various quality curve realizations may be utilized including Gaussian shaped, raised cosine, root raised cosine, and/or other shaping approached. FIG. 4 illustrates exemplary spatial quality distributions for use with content encoding methodology of the disclosure. Curves in FIG. 4 (e.g., 402, 404) may be configured using a width parameter 408 and/or rate of fall off parameter 406.

Figure 5A:
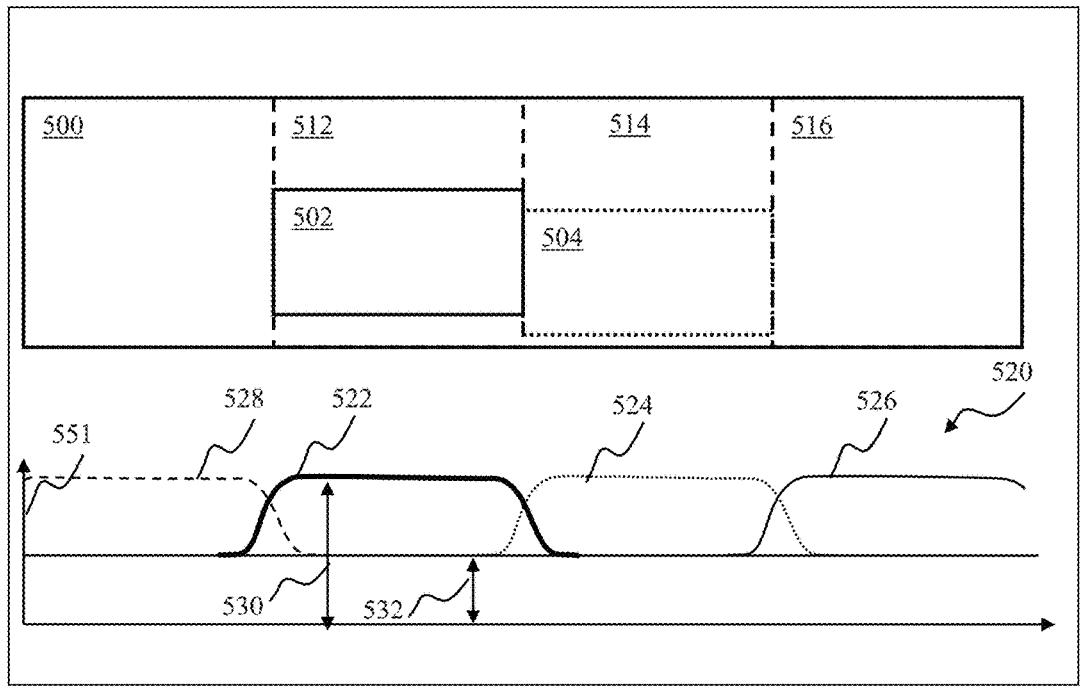
FIG. 5A is a graphical illustration depicting use of multiple spatial quality distribution bands for encoding panoramic image in accordance with the principles of the present disclosure.

FIG. 5A illustrates use of multiple spatial quality bands for encoding panoramic image, in accordance with some implementations of content playback. Panel 500 illustrates position of a viewport within a panoramic image (e.g., image 300 described with respect to FIG. 3). Panel 520 depicts spatial quality parameter configuration. Vertical broken lines may denote boundaries of the image 500 portions associated with multiple quality bands. Individual image portions (e.g., 512, 514, 516) may have a respective spatial encoding quality parameter associated therewith (e.g., denoted by bold curve 522, dotted line curve 524, and broken line curve 526, respectively). For a given encoding quality distribution (e.g., 522) encoding quality (e.g., shown by length of arrow 530) within the image band (e.g., 512) may be configured to exceed encoding quality (e.g., shown by length of arrow 532) outside the image band. Encoding quality level denoted by arrow 532 may correspond to baseline quality used when encoding the overall image 300.

Content of image 500 shown in FIG. 5A may correspond to content uploaded to a content server for subsequent viewing (playback). Various content server implementations may be utilized with the methodology of the disclosure including, network attached storage operating a media server application, a social network server (e.g., Facebook®, YouTube®), a live video distribution network, a digital video recorder, node in a content distribution network, and/or other electronic storage configured to store and provide digital content.

During and/or subsequent to upload of the content, the image 300 may be encoded using spatially adaptive encoding quality methodology. By way of an illustration, as the image 500 is uploaded to a content server, individual portions of the image (e.g. Portions 512, 514, 516) may be encoded using spatial encoding quality distribution characterized by curves 522, 524, 526, respectively. The encoding approach may provide for an increased quality within a given band compared to encoding of the overall image using a given encoding quality level (e.g., constant level 532). Subsequent to upload and encoding, the content server may store one or more encoded image portions corresponding to the original image. In some implementations, baseline quality (e.g., level 532) may correspond to selecting the quantization parameter (QP) of encoding process from the range between 5 and 20. For a given baseline QP, enhanced encoding quality may correspond to QP decrease between 10% and 100% of the base QP.

Solid line rectangle 502 in FIG. 5A may denote a viewport position at a given time (time t1) during content delivery (playback). The viewport 502 may correspond to viewing position 200 of the user in FIG. 2. Content of the viewport 502 may be provided using portion 512 of the image 300 pre-encoded using spatial quality distribution of encoding denoted by curve 522 in FIG. 5A in order to attain an increased quality for a given overall data transmission load. At time t2>t1, the position of the viewport may transition to location denoted by broken line rectangle 504, due to, e.g., change to user viewing position 220 of FIG. 2. In some implementations, position and/or dimensions of the viewport may be modified from location 502 to location 504. The content for viewport 504 may be provided using image 500 portion 514 pre-encoded using spatial quality distribution of encoding denoted by curve 524. Use of pre-encoded image portions (e.g., 512, 514, 516) may enable provision of higher quality content and/or reduced latency compared to solutions of the prior art that may utilize in-time high quality encoding.

Figure 5B:
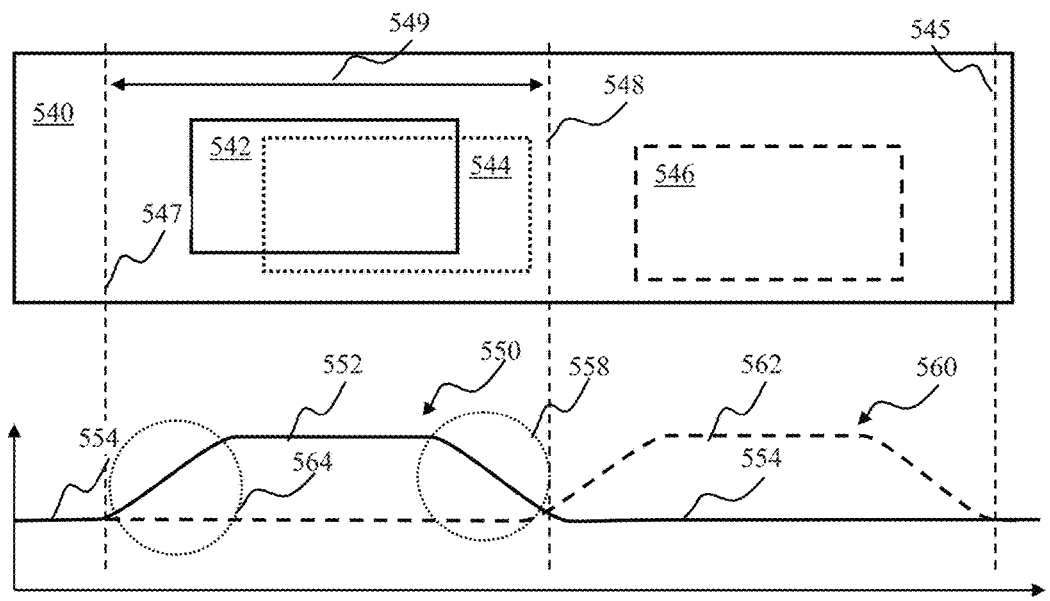
FIG. 5B is a graphical illustration depicting use of spatial quality distribution bands for encoding a viewport during real-time delivery of panoramic content in accordance with the principles of the present disclosure.

FIG. 5B illustrates use of spatial quality distribution bands for encoding content of a viewport during real-time delivery of panoramic content, in accordance with some implementations. Panel 540 illustrates position of a viewport within a panoramic image (e.g., image 300 described with respect to FIG. 3). Curves 550, 560 depict spatial quality parameter configuration of an encoder. Content of image 540 shown in FIG. 5B may correspond to content acquired by a capture device (e.g., 110 of FIG. 1A), e.g., in real time.

Solid line rectangle 542 in FIG. 5B may denote a viewport position at a given time (time t1) during content acquisition and/or real time playback. The viewport 542 may correspond to viewing position 200 of the user in FIG. 2. Content of the viewport 542 may be encoded using spatial quality distribution denoted by curve 550 in FIG. 5B. Encoding quality distribution 550 may include an enhanced quality portion 552 and one or more of base quality portions 554. Vertical axis 551 may denote encoding quality wherein quality may increase in the direction of the arrow of axis 551.

At time t2>t1, position of the viewport may transition to location denoted by broken line rectangle 544, due to, e.g., user intending to view a different portion of the image. Content for viewport 544 may be provided using encoding quality characterized by quality distribution 550. Quality configuration that includes gradual transition from enhanced quality level 552 to baseline quality level 554 (e.g., area denoted by curve 558) may enable content provision without necessitating switching to another bitstream with different encoding parameters (e.g., different QP and/or other parameters affecting encoding quality) and/or re-encoding that may be associated therewith for changes in the viewport position that may be commensurate with the dimensions of the transition area. In some implementations, the width of the transition area may be configured between 5% and 50% of the spatial extent 549 wherein encoding quality may exceed baseline level 554. Vertical broken lines 547, 548 may denote longitudinal extent of the image wherein encoding quality value determined by quality distribution of curve 550 may exceed the baseline quality level 554. Encoding quality distribution that includes a gradual transition of quality from enhanced level to baseline (e.g., area denoted by curve 558) in may enable provision of higher quality content and/or reduced latency compared to solutions of the prior art that may utilize in-time high quality encoding and/or rectangular window for encoding quality.

At time t3>t1, position of the viewport may transition to location denoted by broken line rectangle 546 due to, e.g., user viewing position change (e.g., user changing from configuration 200 to configuration 220 in FIG. 2). Longitudinal extent of the viewport 546 may correspond to baseline quality portion 554 of the quality curve 550. In order to provide content for the viewport 554 at an enhanced quality, encoded bitstream with quality distribution characterized by broken line curve 560 may be utilized. That is, content for the viewport 546 may be sent using a different video stream encoded and/or re-encoded in real time using the quality distribution 560. As longitudinal extent of the viewport 546 is smaller than longitudinal extent of the whole panoramic frame 540, encoding of the viewport 546 may require less time than encoding of the whole frame 540.

During and/or subsequent to upload of the content, the image 300 may be encoded using spatially adaptive encoding quality methodology. By way of an illustration, as the image 300 is uploaded to a content server, individual portions of the image (e.g. Portions 512, 514, 516) may be encoded using spatial encoding quality distribution characterized by curves 522, 524, 526, respectively. The encoding approach may provide for an increased quality within a given band compared to encoding of the overall image using a given encoding quality level (e.g., constant level 532). Subsequent to upload and encoding, the content server may store one or more encoded image portions corresponding to the original image. In some implementations, baseline quality may be achieved by using higher QP (e.g. 30) in macroblocks and/or coding tree units corresponding to area outside viewport window. Lower QP (e.g. 20) may be achieved in areas corresponding to viewport window (e.g., level 532).

In some implementations, a user may view panoramic content using a mobile user interface device (e.g., 120 in FIG. 1A). A user may pan the device through an arc in 360° space. Responsive to the panning motion, viewport into panoramic content may transition from location 542 to location 544 to location 546. Content server may be configured to receive motion parameters of the user interface device (e.g., orientation, rotation, acceleration, gyroscope output and/or other information). The content server may be configured to predict position of the viewport (e.g., position 546 at time t3) based on the motion information of the viewing device and viewport position 542 at time t1 and/or 544 at time t2. Using parameters of the quality distribution curve 550 and viewport predicted position the content server may automatically pre-encode portion of the frame 540 corresponding to viewport location 546 using encoding quality distribution 560 in order to reduce latency when the viewport will move into position 546.

Figure 6:
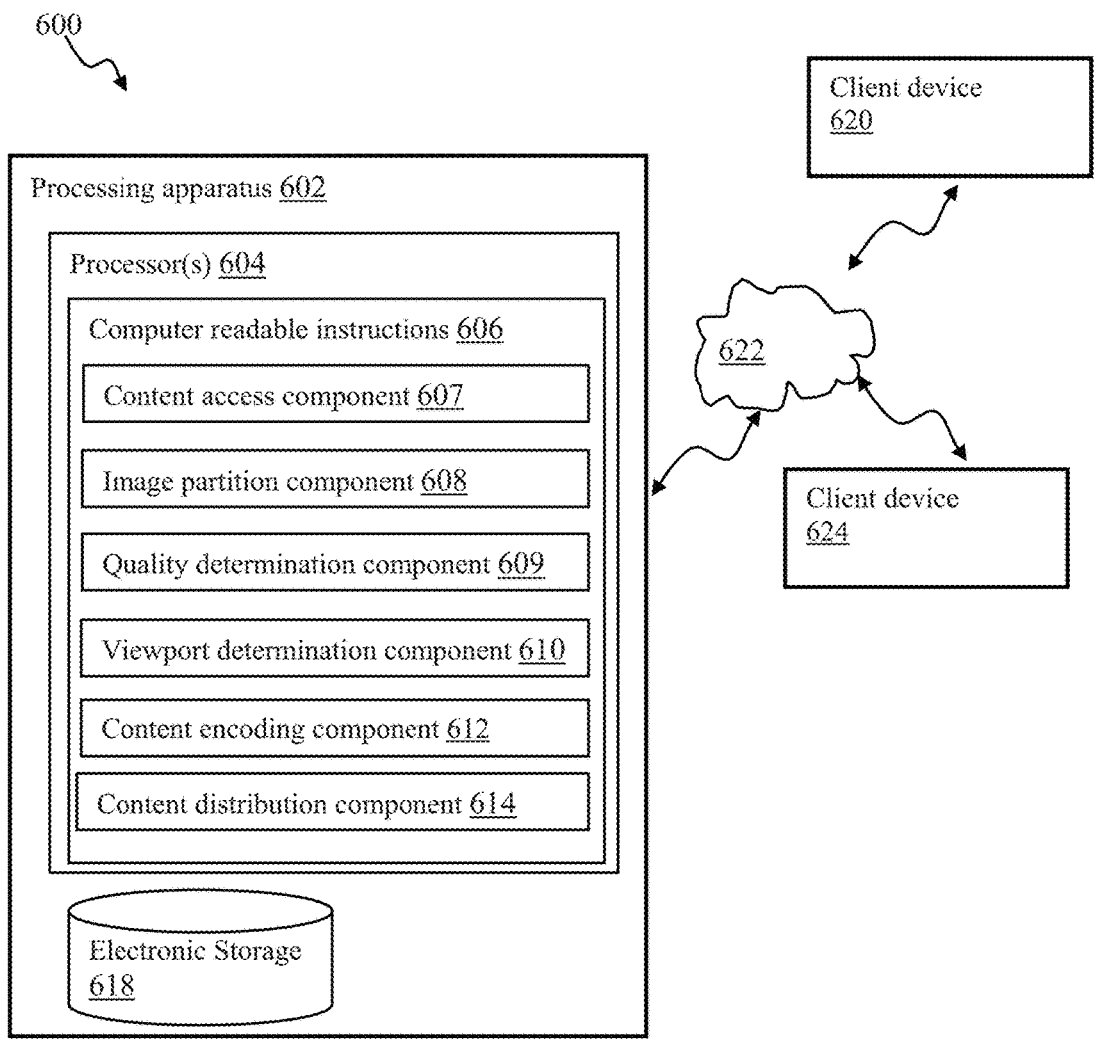
FIG. 6 is a functional block diagram illustrating a system for encoding content using spatially adaptive encoding methodology in accordance with the principles of the present disclosure.

FIG. 6 illustrates a computerized system for encoding content in accordance with one implementation. In some implementations, the system 600 may be configured to encode panoramic and/or VR content as a part of content acquisition and/or content delivery by a capture device (e.g., 110 in FIG. 1A). In one or more implementations, the system 600 may be configured to encode content during and/or as a part of content upload and/or playback of previously acquired content.

The system 600 of FIG. 6 may include a processing apparatus 602 (e.g., including capture device 110 of FIG. 1A, 130 of FIG. 1B, a computing device in communications with a capture device and/or content depository, a cloud computing apparatus, and/or other apparatus) configured to obtain audio and/or imaging content, e.g., video and/or photos. Content depository may include a network attached storage (NAS), a portable storage (e.g., flash memory), a cloud storage, a server, a personal computer, a DVR, and/or other storage configuration.

The apparatus 602 may be in operable communication with one or more remote client devices 620, 624 via one or more electronic communications interface 622. The interface 622 may include one or more wired interfaces (e.g., serial, USB, Thunderbolt™, HDMI, Ethernet, and/or other wired interfaces) and/or wireless interfaces (e.g., WiFi, Bluetooth, cellular, and/or other interfaces). For example, such electronic communication links may be established, at least in part, via one or more networks. In some implementations, a network may comprise the Internet and/or may employ other communications technologies and/or protocols. By way of non-limiting example, the interface 622 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, network 622 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the interface 622 may be represented using formats including one or more of hypertext markup language (HTML), extensible markup language (XML), and/or other formats. One or more exchanges of information between entities of system 100 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 600 may use custom and/or dedicated data communications technologies instead of, or in addition to, the ones described above.

The remote device 620, 624 may include a user interface device, one or more of a portable communications device (e.g., smartphone, a digital camera, a laptop, a tablet computer, a desktop computer, a television set-top box, smart TV, a gaming console, a client computing platform, and/or other platforms), a capture device (e.g., a camera), and/or other device configured to communicate information with the processing apparatus 602. In some implementations, the system 600 may include multiple capture devices, e.g., configured for obtaining panoramic content e.g., such as described in U.S. patent application Ser. No. 14/927,343 entitled "APPARATUS AND METHODS FOR ROLLING SHUTTER COMPENSATION FOR MULTI-CAMERA SYSTEMS" filed on 29 Oct., 2015, incorporated supra.

The apparatus 602 may include one or more physical processors 604 configured by machine-readable instructions 606 and/or other components. Executing the machine-readable instructions 606 may cause the one or more physical processors 604 to effectuate encoding of content using methodology of the disclosure. The machine-readable instructions 606 may include one or more of content access component 607, image partition image component 608, quality determination component 609, viewport determination component 610, content encoding component 612, content distribution component 614, and/or other components.

One or more features and/or functions of the apparatus 602 may be facilitation of video content acquisition, generation and/or provision of content proxy. It is noted that although the present disclosure is directed to videos and/or video clips, one or more other implementations of system 600 and/or apparatus 602 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items.

The apparatus 602 may include electronic storage 618. The apparatus 602 may include communication lines or ports to enable the exchange of information with a network and/or other entities. Illustration of apparatus 602 in FIG. 6 is not intended to be limiting. The apparatus 602 may include a plurality of hardware, software, and/or firmware components operating together to provide the functionality attributed herein to apparatus 602. For example, the apparatus 602 may be implemented by a cloud of computing platforms operating together as apparatus 602.

Electronic storage 618 may comprise electronic storage media that electronically stores information. The electronic storage media of electronic storage 618 may include one or both of system storage that is provided integrally (i.e., substantially non-removable) with apparatus 602 and/or removable storage that is removably connectable to apparatus 602 via, for example, a port or a drive. A port may include a USB port, a Firewire port, and/or other port. A drive may include a disk drive and/or other drive. Electronic storage 618 may include one or more of optically readable storage media (e.g., optical disks, etc.), magnetically readable storage media (e.g., magnetic tape, magnetic hard drive, floppy drive, and/or other magnetic storage media), electrical charge-based storage media (e.g., EEPROM, RAM, etc.), solid-state storage media (e.g., flash drive, etc.), and/or other electronically readable storage media. The electronic storage 618 may include one or more virtual storage resources (e.g., cloud storage, a virtual private network, and/or other virtual storage resources). The electronic storage 618 may be configured to store software algorithms, information determined by processor(s) 604, information received from apparatus 602, information received from external resource(s), and/or other information that enables apparatus 602 to function as described herein.

The system 600 may include an external resource(s) operatively linked via one or more electronic communication links 622. External resource(s) may include sources of information, hosts, and/or other entities outside of system 600, external entities participating with system 600, computing platforms, and/or other resources. In some implementations, some or all of the functionality attributed herein to external resources may be provided by resources included in system 600.

It will be appreciated that this is not intended to be limiting and that the scope of this disclosure includes implementations in which apparatus 602, external resources, and/or other entities may be operatively linked via some other communication media.

Processor(s) 604 may be configured to provide information-processing capabilities in apparatus 602. As such, processor 604 may include one or more of a digital processor, an analog processor, a digital circuit designed to process information, an analog circuit designed to process information, a state machine, and/or other mechanisms for electronically processing information. Although processor 604 is shown in FIG. 6 as a single entity, this is for illustrative purposes only. In some implementations, processor 604 may include one or more processing units. These processing units may be physically located within the same device, or processor 604 may represent processing functionality of a plurality of devices operating in coordination. The processor 604 may be configured to execute components 607, 608, 609, 610, 612, and/or 614. Processor 604 may be configured to execute components 607, 608, 609, 610, 612, and/or 614 by software; hardware; firmware; some combination of software, hardware, and/or firmware; and/or other mechanisms for configuring processing capabilities on processor 604.

It should be appreciated that although components 607, 608, 609, 610, 612, and/or 614 are illustrated in FIG. 6 as being co-located within a single processing unit, in implementations in which processor 604 includes multiple processing units, one or more of components 607, 608, 609, 610, 612, and/or 614 may be located remotely from the other components. The description of the functionality provided by the different 607, 608, 609, 610, 612, and/or 614 described above is for illustrative purposes and is not intended to be limiting, as any of components 607, 608, 609, 610, 612, and/or 614 may provide more or less functionality than is described. For example, one or more of components 607, 608, 609, 610, 612, and/or 614 may be eliminated, and some or all of its functionality may be provided by other ones of components 607, 608, 609, 610, 612, and/or 614 and/or other components. As an example, processor 604 may be configured to execute one or more additional components that may perform some or all of the functionality attributed below to one of components 607, 608, 609, 610, 612, and/or 614.

In FIG. 6, the content component may be configured to access and/or manage image and/or audio content. In some implementations, the component 607 may be configured to effectuate image/audio content acquisition using any applicable methodologies including those described herein. By way of an illustration, the component 607 may be operable to instantiate content acquisition by, e.g., the capture device 110 of FIG. 1A, based on a timer event, user instruction, or a sensor event. In one or more implementations, the component 607 may be operable effectuate content acquisition by a VR headset, e.g., such as shown in FIG. 2. . In some implementations, the component 607 may be operable to access previously acquired content from electronic storage 618 and/or external resource (e.g., external storage, and/or remote user device during content upload). The operations performed by the content component 607 may include information timestamping, adjustment of data rate, transcoding, post processing (e.g., adjusting white balance, sharpening, contrast, gamma and/or other parameters), trimming, and/or other operations. In some implementations, the image/audio content and the metadata may be stored in a multimedia storage container (e.g., MP4, MOV) such as described in detail in U.S. patent application Ser. No. 14/920,427, entitled "APPARATUS AND METHODS FOR EMBEDDING METADATA INTO VIDEO STREAM" filed on 22 Oct., 2015, incorporated supra, and/or in a session container (e.g., such as described in detail in U.S. patent application Ser. No. 15/001,038, entitled "STORAGE OF METADATA AND IMAGES" filed on 19 Jan., 2016, the foregoing being incorporated herein by reference in its entirety).

In FIG. 6 the image partition component 608 may be configured to effectuate partitioning of one or more individual images of the imaging content, e.g., using methodology described with respect to FIG. 5A.

In FIG. 6 the quality determination component 609 may be configured to effectuate configuring spatial quality distribution for content encoding, e.g., such as shown by curves 320 in FIG. 3, 402, 404 in FIG. 4, 522, 524, 526 in FIG. 5A, and/or 550, 560 in FIG. 5B.

In FIG. 6, viewport determination component 610 may be configured to determine viewport configuration. In some implementations, the viewport (e.g., 212 in FIG. 2, and/or 542 in FIG. 5B) may be obtained based on coordinates of two diagonally opposing corners of a rectangle provided by. e.g., client device 620. In one or more implementations, the viewport may be obtained based on orientation sensor output (e.g., gyro) of the client device 620. The playback device may send absolute coordinates of the rectangle that is being displayed (pixels values corresponding to top-left and bottom-right points). This may be performed at per frame interval). In some implementations, the viewport may be updated based on viewport changes. In some implementations, gyro information (in real time) may be sent from playback device.

In FIG. 6, content encoding component 612, may be configured to effectuate obtaining encoded bitstream of content accessed by component 607 using spatial quality distribution obtained by, e.g., component 908.

In FIG. 6, content distribution component 614, may be configured to provide the encoded content. The content provision may include storing the content on the storage component 618 for viewing; broadcasting content, and/or otherwise delivering content to one or more client devices (e.g., the remote device 620, 624 (e.g., smartphone) and/or external resource (e.g., cloud storage)), and/or other operations.

Figure 7A:
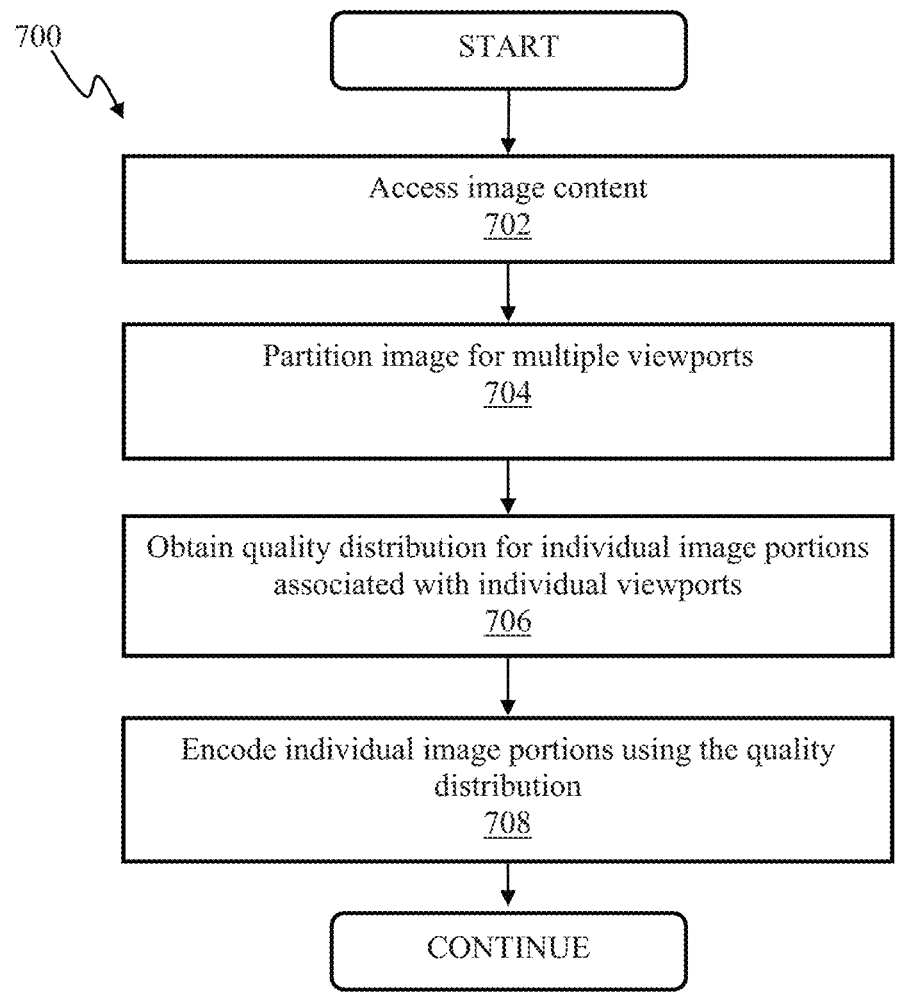
FIG. 7A is logical flow diagram illustrating a method of encoding panoramic content in accordance with the principles of the present disclosure.
Figure 7B:
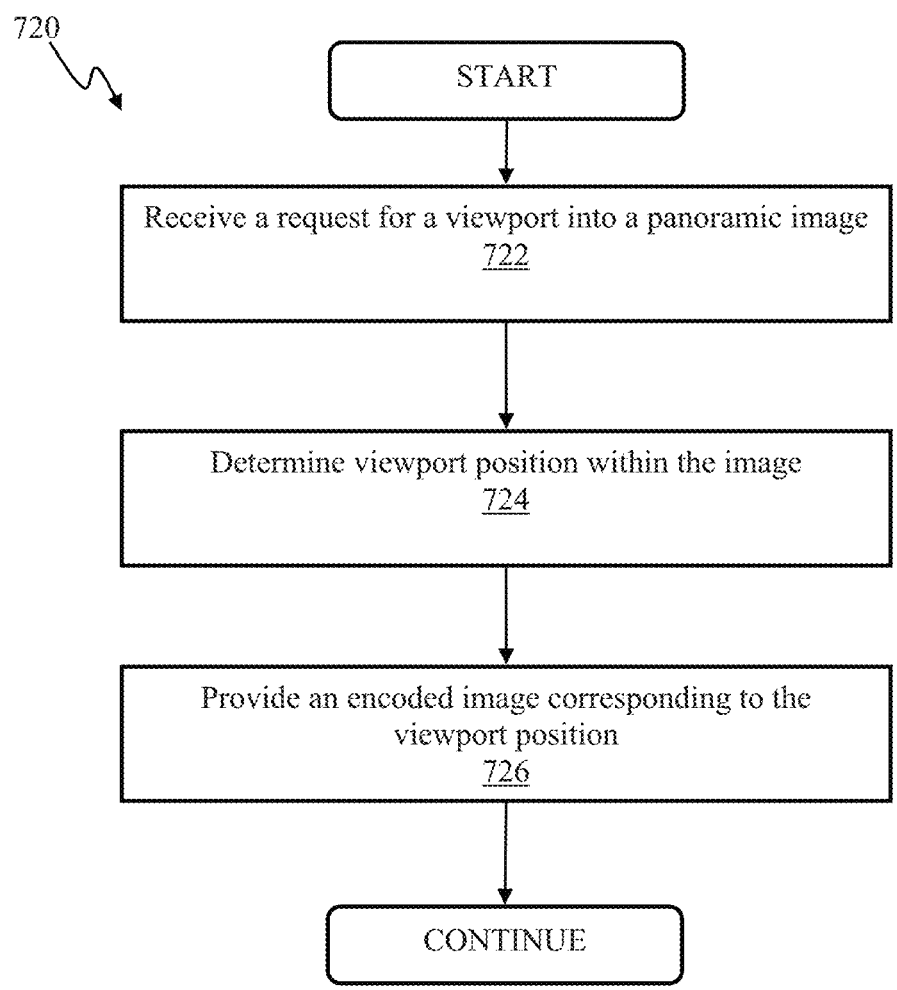
FIG. 7B is logical flow diagram illustrating a method of providing encoded content for a viewport into panoramic content in accordance with the principles of the present disclosure.
Figure 7C:
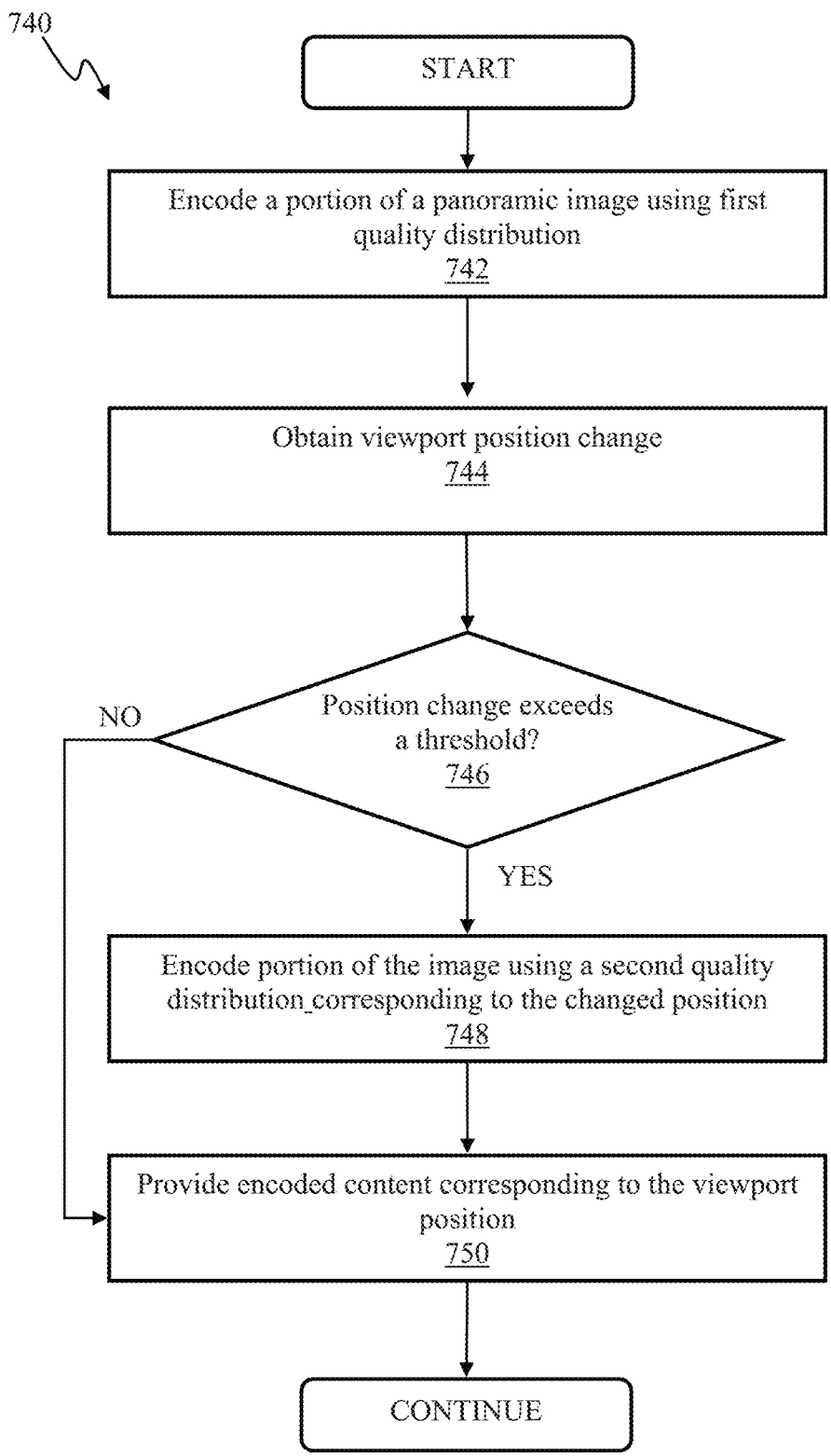
FIG. 7C is logical flow diagram illustrating a method of providing a content for a viewport of panoramic content in accordance with the principles of the present disclosure.

FIGS. 7A-7C illustrate methods 700, 720, 740 for providing panoramic content in accordance with some implementations of the present disclosure. The operations of methods 700, 720, 740 presented below are intended to be illustrative. In some implementations, methods 700, 720, 740 may be accomplished with one or more additional operations not described, and/or without one or more of the operations discussed. Additionally, the order in which the operations of methods 700, 720, 740 are illustrated in FIGS. 7A-7C and described below is not intended to be limiting.

In some implementations, methods 700, 720, 740 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 700, 720, 740 in response to instructions stored electronically on an electronic storage medium. The one or more processing devices may include one or more devices configured through hardware, firmware, and/or software to be specifically designed for execution of one or more of the operations of methods 700, 720, 740. Operations of methods 700, 720, 740 may be effectuated by one or more devices and/or computerized systems including those described with respect to FIGS. 1A-1B and/or FIG. 6.

FIG. 7A is logical flow diagram illustrating a method of encoding panoramic content in accordance with one implementation of the present disclosure. Method 700 of FIG. 7A may be implemented by, e.g., system 600 of FIG. 6. In some implementations, operations of method 700 may be performed by a content server based on receipt of content (e.g., content upload by a user).

At operation 702 of method 700 image content may be accessed. In some implementations, the content may include a sequence of high resolution images (e.g., 4K, 8K, and/or other resolution) refreshed at a given frame rate (e.g., between 1 fps and 1000 fps). In some implementations, the accessed content may correspond to spherical content (e.g., 7920 by 2160 pixels obtained at 60 fps) uploaded onto a content server.

At operation 704 one or more images of the content may be partitioned in accordance with one or more viewports. By way of a non-limiting illustration, image 500 may be partitioned into portions corresponding to 1920 pixels by 2160 pixel portions 512, 514, 516 in FIG. 5A.

At operation 706 encoding quality distribution for individual image portions associated with individual view ports may be obtained. In some implementations, quality distribution may include a baseline portion 532 and an enhanced quality portion 530 shown by curves 522, 524, 526, 528 in FIG. 5A.

At operation 708 individual image portions may be encoded using respective quality distribution. By way of an illustration, image portion 512 may be encoded using quality distribution 522, image portion 514 may be encoded using quality distribution 524.

Content encoded using methodology of method 700 may be provided using operations of method 720 described herein.

FIG. 7B is logical flow diagram illustrating a method of providing encoded content for a viewport into panoramic content in accordance with one implementation of the present disclosure. In some implementations, operations of method 720 may be effectuated during playback of content that has been previously encoded using. e.g., methodology of method 700.

At operation 722 of method 720 a request for a viewport into a panoramic image may be obtained. In some implementations, the request may be based on a user wishing to view previously uploaded panoramic content on a social media server.

At operation 724 viewport position within the image may be obtained.

At operation 726 encoded image corresponding to the viewport position may be provided.

FIG. 7C is logical flow diagram illustrating a method of providing a content for a viewport of panoramic content in accordance with one implementation of the present disclosure. Operations of method 740 may be effectuated by a processing apparatus 602 of FIG. 6 and/or content capture device 120, 130 of FIGS. 1A-1B.

At operation 742 a portion of a panoramic image may be encoded using first quality distribution. In some implementations, operation 742 may be effectuated as a part of real time content consumption, e.g., a user viewing content using client device 120 of FIG. 1A and viewport 542 of FIG. SB. The portion may include portion of the image 540 between two vertical broken lines 547, 548 in FIG. SB.

At operation 744 viewport position change may be obtained. In some implementation, the viewport position change may obtained based on analysis of position and/or orientation information of the client device. In one or more implementations the viewport position change may be obtained based on a request from the client device (e.g., the client device may transmit coordinates of the viewport opposing corners of the viewport 544, 546 in FIG. SA).

At operation 746 a determination may be made as to whether viewport position change exceeds a threshold. Operation 746 may include evaluation of current viewport position (e.g., 542, 544 in FIG. SA) and new requested position (e.g., 544, 546, respectively). The threshold may include a viewport displacement measure that may be configured based on longitudinal extent of the enhanced quality portion of the quality curve 550, position of the viewport with respect to the enhanced quality portion, available bandwidth, minimum affordable quality of encoding and/or other parameters.

Responsive to a determination at operation 746 that the viewport position change does not exceed the threshold, the method may proceed to operation 750 wherein content encoded at operation 742 and corresponding to the viewport (e.g., 544 in FIG. 5B) may be provided.

Responsive to a determination at operation 746 that the viewport position change exceeds the threshold, the method may proceed to operation 748 wherein content, corresponding to image portion between vertical broken lines 548, 545 in FIG. 5B, may be encoded using a second quality distribution corresponding to the changed position of the viewport (e.g., viewport 546 in FIG. 5B). The method may then proceed to operation 750 wherein content encoded at operation 748 and corresponding to the viewport (e.g., 546 in FIG. 5B) may be provided.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection", "link", "wireless link" means a causal link between any two or more entities (whether physical or logical/virtual), which enables information exchange between the entities.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:
1. A system for providing video content, the system comprising:
an electronic storage configured to store the video content, the video content including a high bitrate image;

a communications interface configured to communicate a bit stream associated with the stored video content to a client device; and one or more physical processors configured to execute a plurality of computer readable instructions, where the plurality of computer readable instructions when executed by the one or more physical processors is configured to:

access the high bitrate image;

partition the high bitrate image into image portions based at least in part on a dimension of a viewport, the image portions comprising a first image portion and a second image portion;

obtain quality distributions corresponding to the image portions, the quality distributions including a first quality distribution corresponding to the first image portion and a second quality distribution corresponding to the second image portion;

encode the first image portion and the second image portion using the corresponding first and second quality distributions, the encoding of the first image portion and the second image portion resulting in an enhanced quality level for the first image portion and the second image portion;

receive a viewport position from the viewport, the viewport position associated with the first image portion;

provide the encoded first image portion at the enhanced quality level associated with the first quality distribution;

receive a viewport position change from the viewport;

determine whether the viewport position change exceeds a threshold value;

when the viewport position change exceeds the threshold value, provide a differing encoded image portion at the enhanced quality level, the differing encoded image portion being different than the encoded first image portion; and when the viewport position change does not exceed the threshold value, continue to provide the encoded first image portion at the enhanced quality level associated with the first quality distribution; and provide the remainder of the high bitrate image at a baseline quality level, the baseline quality level being less than the enhanced quality level.

2. The system of claim 1, wherein the plurality of computer readable instructions when executed by the one or more physical processors are further configured to:

receive a second viewport position from the viewport, the second viewport position associated with the second image portion;

transition from provision of the encoded first image portion to provision of the encoded second image portion;

provide the encoded second image portion at the enhanced quality level associated with the second quality distribution; and provide the remainder of the high bitrate image at the baseline quality level, the baseline quality level being less than the enhanced quality level.

3. The system of claim 1, wherein the enhanced quality level further comprises a gradual transition area, the gradual transition area transitioning from the enhanced quality level to the baseline quality level.

4. The system of claim 3, wherein the enhanced quality level is characterized by a first range of quantization parameters, the gradual transition area is characterized by a second range of quantization parameters, and the baseline quality level is characterized by a third range of quantization parameters, an average of the first range of quantization parameters being less than an average of the second range of quantization parameters, and the average of the second range of quantization parameters being less than an average of the third range of quantization parameters.

5. The system of claim 4, wherein the gradual transition area is configured to reduce latencies associated with the provision of the first encoded image portion.

6. The system of claim 1, wherein the plurality of computer readable instructions when executed by the one or more physical processors are further configured to:

adjust the threshold value, where the adjustment of the threshold value is configured to reduce latencies associated with the provision of the first encoded image portion.

7. The system of claim 1, wherein the high bitrate image comprises panoramic content, and the received viewport position is associated with a portion of the panoramic content.

8. The system of claim 7, wherein the enhanced quality level for the first image portion comprises a first gradual transition area, the first gradual transition area transitioning from the enhanced quality level for the first image portion to the baseline quality level, and the enhanced quality level for the second image portion comprises a second gradual transition area, the second gradual transition area transitioning from the enhanced quality level for the second image portion to the baseline quality level; and wherein the first gradual transition area and the second gradual transition at least partly overlap within the panoramic content.

9. A method for providing video content, the method comprising:

accessing the high bitrate image;

partitioning the high bitrate image into image portions based at least in part on a dimension of a viewport, the image portions comprising a first image portion and a second image portion;

obtaining quality distributions corresponding to the image portions, the quality distributions including a first quality distribution corresponding to the first image portion and a second quality distribution corresponding to the second image portion;

encoding the first image portion and the second image portion using the corresponding first and second quality distributions, the encoding of the first image portion and the second image portion resulting in an enhanced quality level for the first image portion and the second image portion;

receiving a viewport position from the viewport, the viewport position associated with the first image portion;

providing the encoded first image portion at the enhanced quality level associated with the first quality distribution;

receiving a viewport position change from the viewport;

determining whether the viewport position change exceeds a threshold value;

when the viewport position change exceeds the threshold value, providing a differing encoded image portion at the enhanced quality level, the differing encoded image portion being different than the encoded first image portion; and when the viewport position change does not exceed the threshold value, continuing to provide the encoded first image portion at the enhanced quality level associated with the first quality distribution; and providing the remainder of the high bitrate image at a baseline quality level, the baseline quality level being less than the enhanced quality level.

10. The method of claim 9, wherein the encoding of the first image portion using the corresponding first quality distribution further comprises encoding using a spatially varying quality of encoding for the first image portion, the spatially varying quality of encoding comprising an enhanced quality portion and a transitional quality portion, the transitional quality portion varying the encoding quality from the enhanced quality portion to a baseline quality portion.

11. The method of claim 9, further comprising predicting a future viewport position, the predicted future viewport position being determined based at least in part on the changed viewport position and a prior viewport position.

12. The method of claim 9, further comprising:
receiving a second viewport position from the viewport, the second viewport position associated with the second image portion;
transitioning from provision of the encoded first image portion to provision of the encoded second image portion;
providing the encoded second image portion at the enhanced quality level associated with the second quality distribution; and
providing the remainder of the high bitrate image at the baseline quality level, the baseline quality level being less than the enhanced quality level.

13. The method of claim 9, further comprising:
adjusting the threshold value, the adjusting of the threshold value comprising reducing latencies associated with the providing of the first encoded image portion.

14. The method of claim 9, wherein the determining of whether the viewport position change exceeds the threshold value comprises measuring a displacement of the viewport with respect to a longitudinal extent of a distribution correlated with encoding quality.

15. A non-transitory computer-readable medium comprising a storage apparatus having a plurality of instructions stored thereon, the plurality of instructions being configured to, when executed by a processor apparatus, cause a computerized apparatus to:
access the high bitrate image;
partition the high bitrate image into image portions based at least in part on a dimension of a viewport, the image portions comprising a first image portion and a second image portion;
obtain quality distributions corresponding to the image portions, the quality distributions including a first quality distribution corresponding to the first image portion and a second quality distribution corresponding to the second image portion;
encode the first image portion and the second image portion using the corresponding first and second quality distributions, the encoding of the first image portion and the second image portion resulting in an enhanced quality level for the first image portion and the second image portion;
receive a viewport position from the viewport, the viewport position associated with the first image portion;
provide the encoded first image portion at the enhanced quality level associated with the first quality distribution;
receive a viewport position change from the viewport;
determine whether the viewport position change exceeds a threshold value;
when the viewport position change exceeds the threshold value, provide a differing encoded image portion at the enhanced quality level, the differing encoded image portion being different than the encoded first image portion; and
when the viewport position change does not exceed the threshold value, continue to provide the encoded first image portion at the enhanced quality level associated with the first quality distribution; and
provide the remainder of the high bitrate image at a baseline quality level, the baseline quality level being less than the enhanced quality level.

16. The computer-readable medium of claim 15, wherein the enhanced quality level further comprises a gradual transition area, the gradual transition area transitioning from the enhanced quality level to the baseline quality level.

17. The computer-readable medium of claim 16, wherein the enhanced quality level is characterized by a first range of quantization parameters, the gradual transition area is characterized by a second range of quantization parameters, and the baseline quality level is characterized by a third range of quantization parameters, an average of the first range of quantization parameters being less than an average of the second range of quantization parameters, and the average of the second range of quantization parameters being less than an average of the third range of quantization parameters.

18. The computer-readable medium of claim 15, wherein the plurality of instructions are further configured to, when executed by the processor apparatus, cause the computerized apparatus to:
adjust the threshold value, where the adjustment of the threshold value is configured to reduce latencies associated with the provision of the first encoded image portion.

19. The computer-readable medium of claim 15, wherein the high bitrate image comprises panoramic content, and the received viewport position is associated with a portion of the panoramic content.

20. The computer-readable medium of claim 15, wherein the determination of whether the viewport position change exceeds the threshold value is based on the viewport position with respect to a longitudinal extent of a distribution correlated with encoding quality.

\* \* \* \* \*